United States Patent [19]

Baghdady

[11] Patent Number: 5,434,577

[45] Date of Patent: Jul. 18, 1995

[54] SIGNAL MODULATION METHODS AND APPARATUS

[76] Inventor: Elie J. Baghdady, 21 Overlook Dr., Weston, Mass. 02193

[21] Appl. No.: 437,898

[22] Filed: Nov. 17, 1989

[51] Int. Cl.$^6$ .............................. G01S 3/16
[52] U.S. Cl. .................... 342/380; 342/382
[58] Field of Search ................ 342/380, 382

[56] References Cited

U.S. PATENT DOCUMENTS

| | | |
|---|---|---|
| 4,060,809 | 11/1977 | Baghdady . |
| 4,088,955 | 5/1978 | Baghdady . |
| 4,106,023 | 8/1978 | Baghdady . |
| 4,203,133 | 5/1980 | Baghdady . |
| 4,298,872 | 11/1981 | Rodgers ............................ 342/380 |
| 4,313,116 | 1/1982 | Powell et al. ..................... 342/380 |
| 4,495,502 | 1/1985 | Masak .............................. 342/380 |

Primary Examiner—David C. Cain
Attorney, Agent, or Firm—Burns, Doane, Swecker and Mathis

[57] ABSTRACT

The disclosure relates to methods and apparatus for facilitating the accurate measurement of Doppler frequency shift induced on a one-way-propagated signal wave either by deliberate on-platform controlled actual or simulated motion of a receiving antenna means, or by relative motion between transmitting and receiving platforms, or by both. The methods and apparatus of this invention are directed to the suppression of identifiable components of a composite modulation process on a sinusoidal carrier, for the purpose of retaining, for separate detection, measurement or transmission, the result of any of the aforementioned frequency-shift inducing processes.

10 Claims, 28 Drawing Sheets

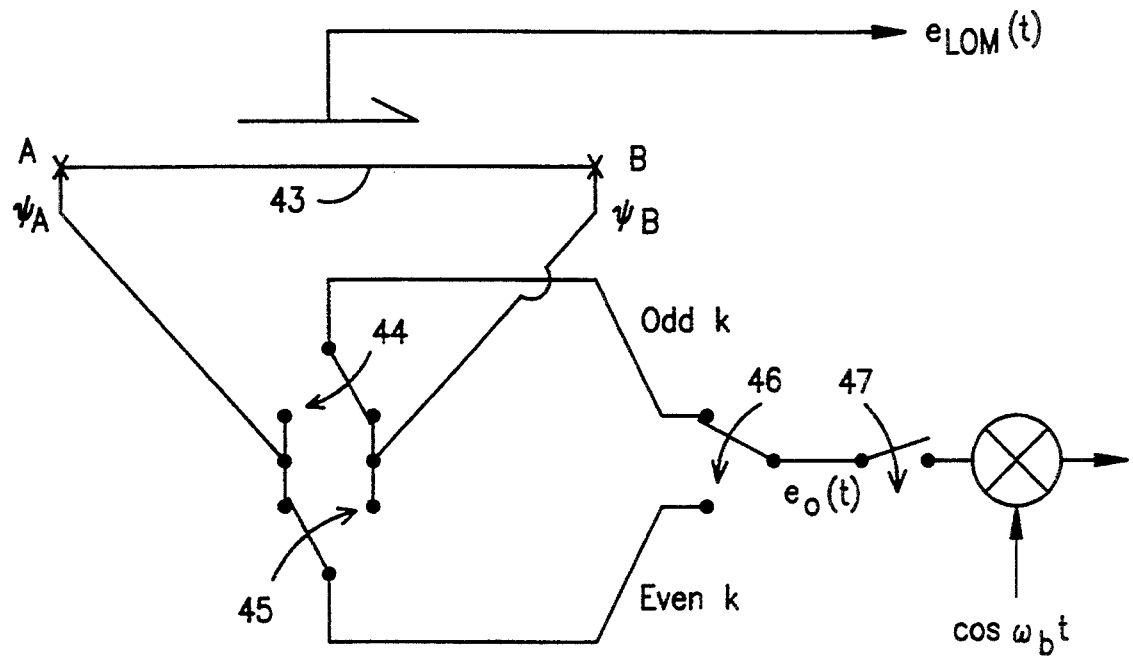
FIG. 13a)
FIG. 13b)
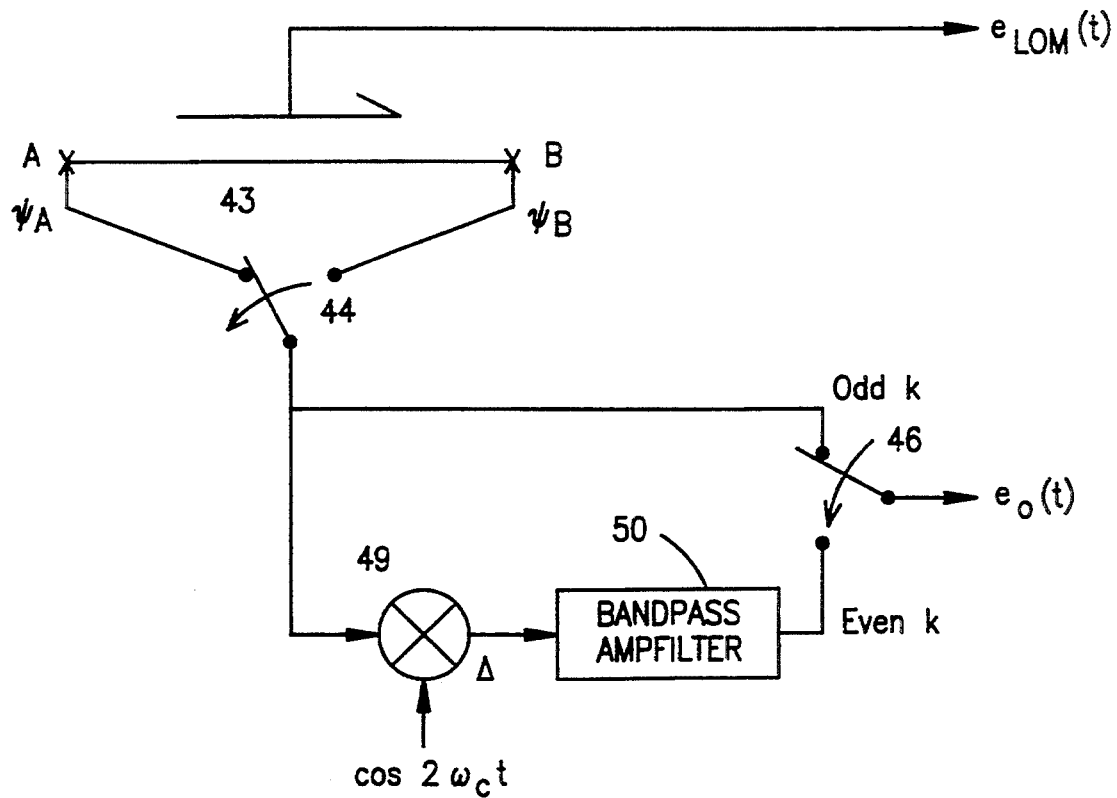

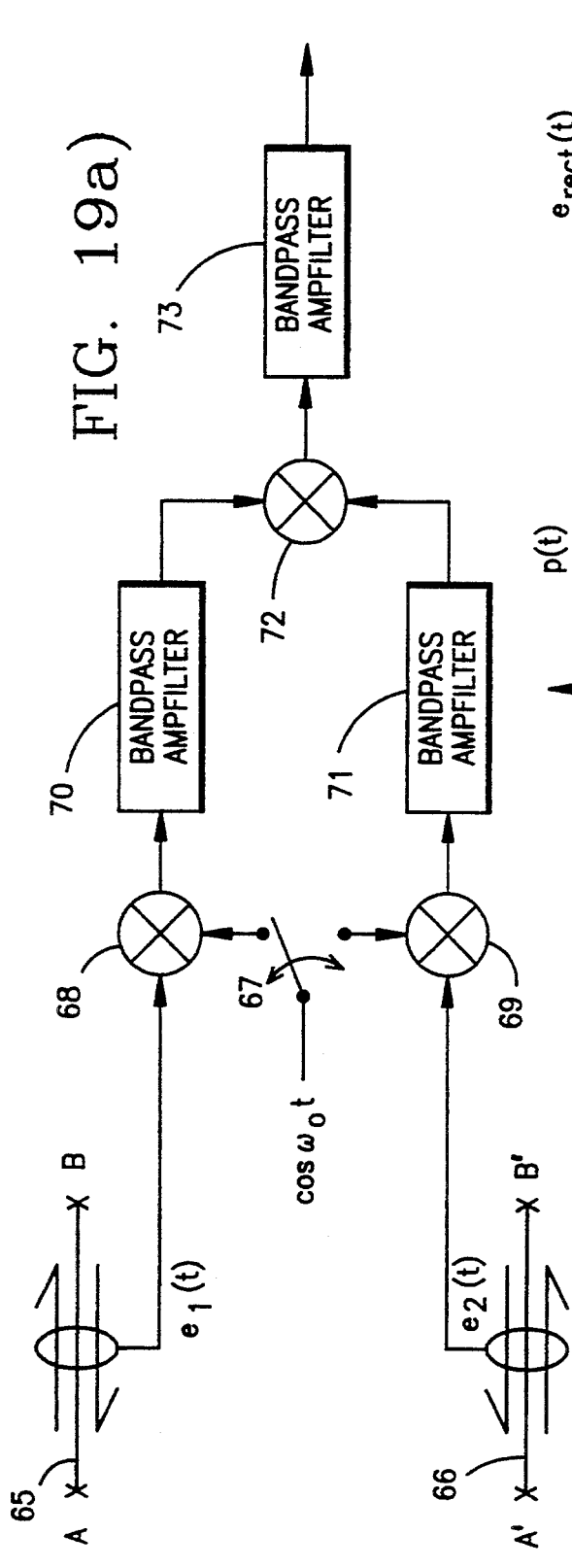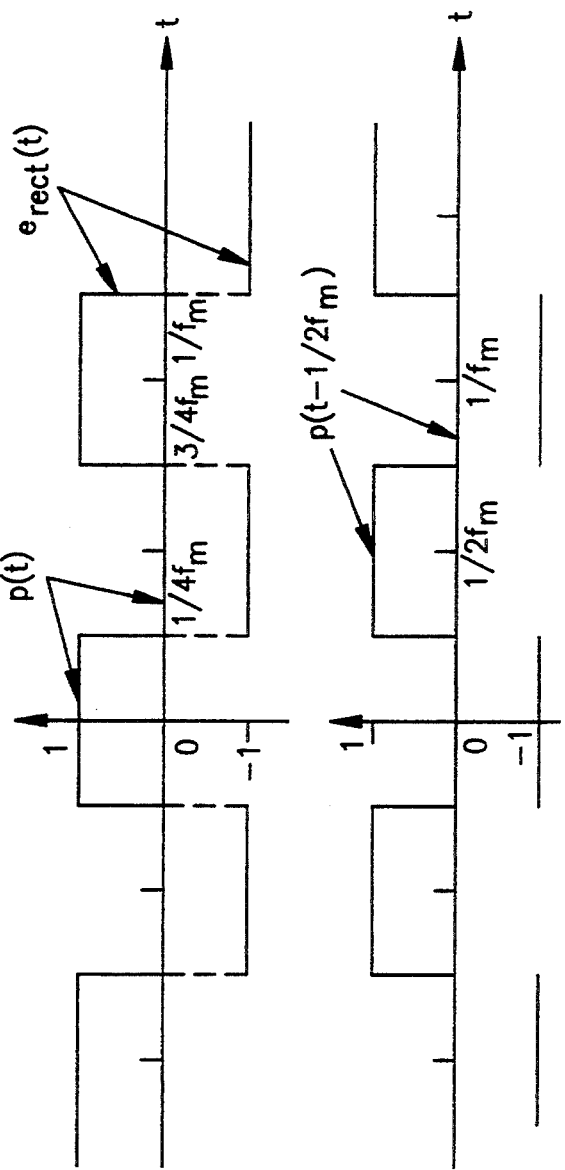
FIG. 19a)
FIG. 19b)

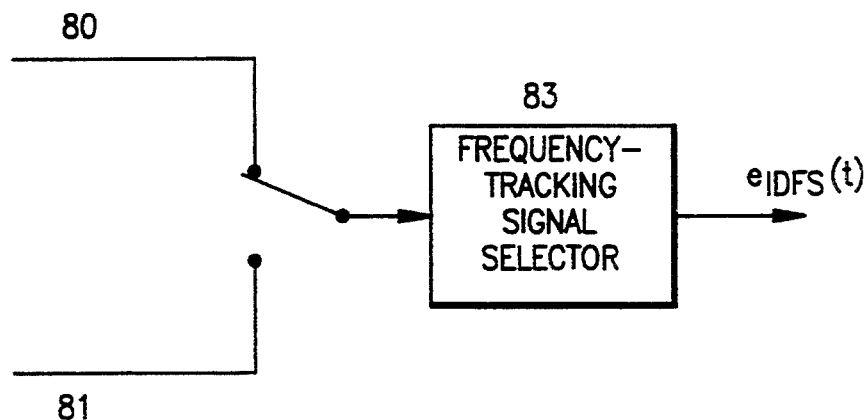
FIG. 22a)
FIG. 22b)
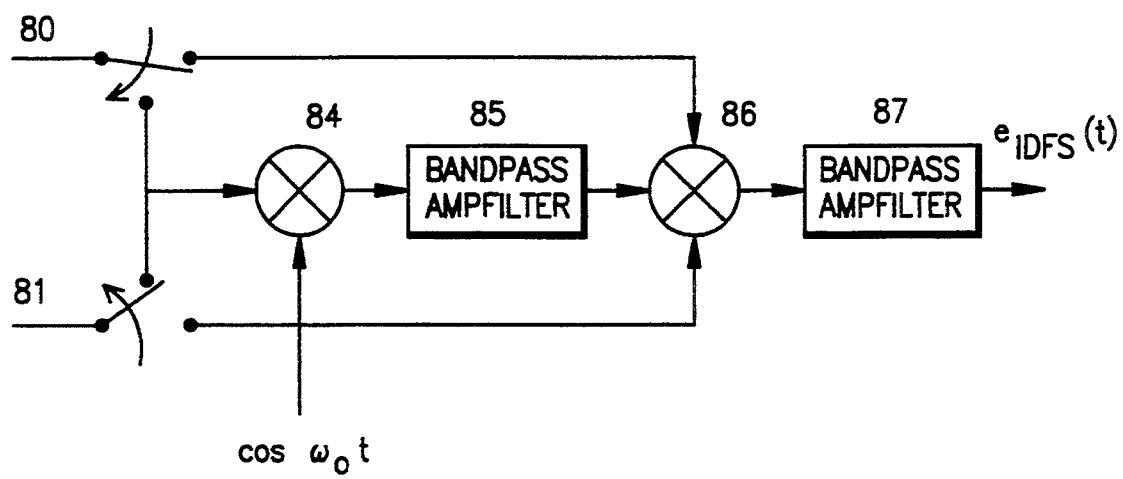

SIGNAL MODULATION METHODS AND APPARATUS

BACKGROUND OF THE INVENTION

This disclosure relates to methods and apparatus for facilitating the accurate measurement of frequency shift induced by the Doppler effect on a signal wave as a result of relative linear motion between the source (transmitter or reflector) and the receiving sensor.

It is highly desirable to be able to operate on a one-way propagated signal wave from a remote source to extract not only the data/information it carries as a result of deliberate modulation at the source, but also changes in any of its parameters, introduced after the signal energy has left the source, that may provide information about the propagation mechanism or about position and derivatives of position coordinates of the source relative to the position of the receiving sensor.

Of particular importance in this disclosure is change, or shift, in the carrier frequency of a signal wave imparted by the Doppler effect, in propagation, due to relative linear motion between source and receiver sensing element. Such relative linear motion may exist between source platform and receiver platform, which is manifested by a rate of change of range, or separating radial distance, between the platforms. Such so-called range rate gives rise to what, for distinction, we call herein range-rate Doppler shift. Relative linear motion may also be introduced independently in situ (or within the structure of one or both of the terminals, or on-site, or onboard) by locally moving the transmitting antenna means or/and the receiving sensor means, in actuality or by simulation means. This latter gives rise to what we call induced Doppler (or directional) frequency modulation, or IDFM for short.

Accurate measurement of range-rate Doppler enables the determination of range rate (or relative velocity) between source and receiver platforms and, with proper initiation and integration of the measured range rate, the determination of "instantaneous" range or radial distance between the two, without requiring the addition of a coherent transponder at the source to be tracked and signal radiation from the station of the receiving sensor.

In air traffic surveillance, monitoring and control, in radio-beacon aids to navigation and position location, and in aircraft, missile and weapons test ranges, the possibility of deriving trackmetric data from a communication signal, a beacon signal or a telemetry signal emanating from the target object obviates the need for adding a special coherent transponder onboard the target aircraft, "lighthouse", or test object for coherent turn-around re-radiation of a sensor-sourced illuminating search signal. A coherent transponder for a special tracking search signal adds an oft undesirable or unacceptable requirement of additional power-consuming, space-occupying, weight-increasing and hardware reliability degrading equipment, not to mention the tracking signal sourcing and reception requirements in the search and sensing station.

The need for an onboard transponder can of course be obviated in some instances by illuminating the target object from the search and sensing station and measuring the two-way Doppler on the resulting back-scattered or skin-reflected signal. However, skin-returned signals are subject to a) two-way, $1/\rho^4$-law propagation attenuation, where $\rho$ is the one-way range; b) limitations of small physical dimensions, and hence reflection cross-section, of most target objects; and c) the limitations of skin-reflection lobing and other scattering (or "radar") cross-section degrading effects.

It is therefore an object of this invention to provide methods for facilitating range-rate Doppler frequency-shift measurements on one-way propagated signals that are intended primarily for communication, telemetry or location beaconing.

However, while the source-applied modulation can usually be detected without serious interference from the Doppler-shift waveform, the Doppler frequency-shift would ordinarily be severely masked by any source modulation of the signal frequency.

Accordingly, it is a principal object of this invention to provide a method for effectively suppressing frequency modulation applied at the source while retaining any range-rate Doppler frequency-shift/modulation present to within a specified tolerance on error due to residual source modulation and/or Doppler-shift modulation distortion.

This invention also relates to the reception and radiation of radio waves in such ways as to induce in them direction-dependent frequency shifts, henceforth referred to as "IDFS", by means of the Doppler effect, free of certain phase-step and/or frequency-step modulations that degrade the measurement of said IDFS, and thereby facilitate the accurate measurement of said IDFS. It is well-known that said ways comprise in situ (or on-site) controlled motion of one or more than one antenna, or the simulation of such motion by commutating the receiver input, or the transmitter output, among fixed, spaced antennas arranged along an antenna line of motion (henceforth, LOM). The advantages of employing actual or simulated in situ moving antennas are well known in the art (see Baghdady U.S. Pat. Nos. 4,060,809, 4,088,955, 4,106,023, 4,203,113). It is also known that the dimensional limitations of platforms necessitate either jumps in antenna position from one end of an LOM to another, which introduces unwanted phase steps, or the abrupt reversal of the sense of antenna motion along the LOM, which introduces frequency steps, in between gradual excursions of antenna position between the end points of the LOM. It is further known that if further measures as provided by the present invention are not included in the implementation of said methods of inducing IDFS, to counteract the occurrence or eliminate said phase steps and/or frequency steps, then the IDFS measurement will fall short of achieving the full potential performance described in the reference patents, for direction-of-arrival measurement, emitter location-coordinates determination, radio aids to navigation (including ultra-precision rectilinear Doppler VOR) air traffic control instrumentation, multipath separation, and cochannel- and adjacent-channel interference rejection, as well as collision anticipation miniradar for automobile airbag inflation and headway control, and spacecraft-docking miniradar aid.

It is therefore a further object of this invention to provide methods and apparatus for cancelling out phase steps and/or frequency steps due to abrupt changes in antenna position or sense of in situ antenna motion intended to induce signal wave IDFS.

It is yet a further object of this invention to provide methods and apparatus for eliminating unwanted phase-step and/or frequency-step modulation components present on a signal wave.

These and other objects and features of this invention will become apparent from the claims, and from the following description when read in conjunction with the accompanying drawings.

BRIEF DESCRIPTION OF THE DRAWINGS

FIG. 19 illustrates another embodiment of the present invention employing switching between two LOM's, each being alternating-bidirectionally traversed to avert unwanted frequency steps due to abrupt motion-sense reversals at the ends of the LOM's.

FIG. 22 illustrates methods for switching between signal replicas carrying alternating frequency-step modulations of opposite phase to obtain a continuous-frequency output.

DETAILED DESCRIPTION

Figure 1:
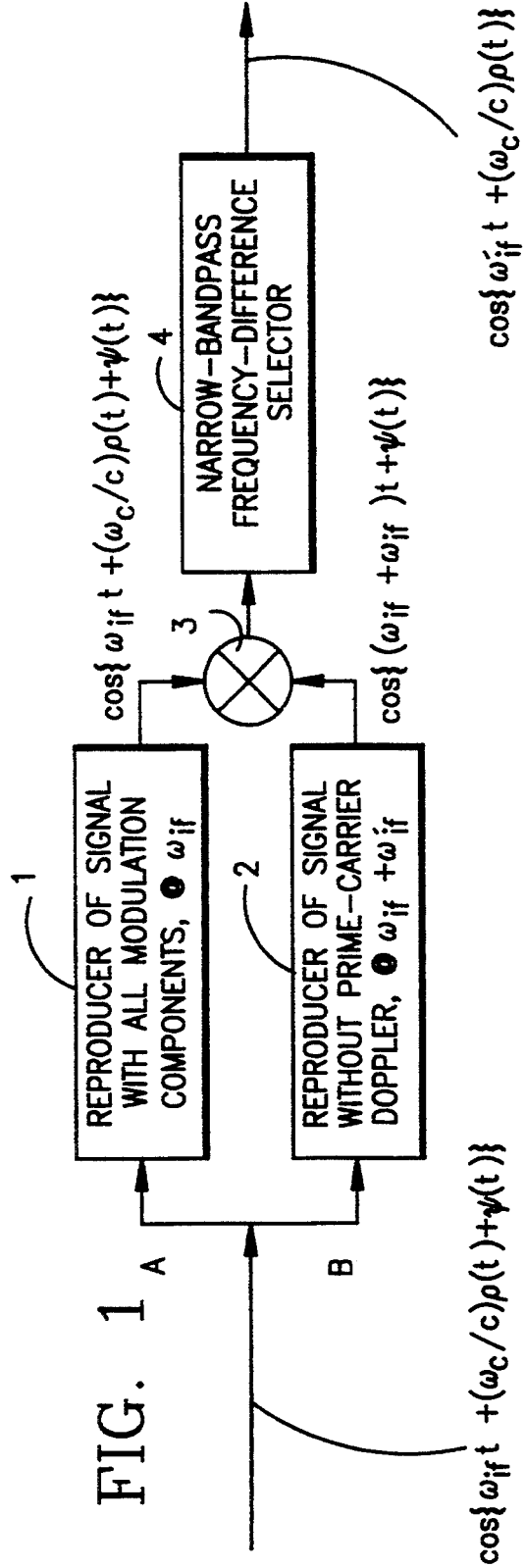
FIG. 1 is a functional block illustration of a method of subtracting out an unwanted component of frequency modulation according to this invention.

The present invention relates to methods and apparatus for selective excision, cancellation, elimination suppression or stripping off of unwanted components of exponent (i.e., phase or frequency) modulation on a sinusoidal carrier. Unwanted components of exponent modulation degenerate a number of operations, including, in particular, a) The process of detection or counting of Doppler frequency shift, modulation or spread, induced, on a signal wave carrying modulation deliberately applied at the source, in propagation by the propagation medium and/or by relative motion (or range rate) between the source platform and the sensor platform, the source-applied modulation being considered in this instance as the unwanted component with the interest centered on the modulation acquired in transit.

b) The process of deliberately inducing Doppler frequency modulation (henceforth referred to as IDFM or IDFS) on a signal wave by in situ repetitively moving an antenna (either receiving or transmitting) over an open path (i.e., one having separate end points), or by simulating such motion by commutating the receiver input, or the transmitter output, among fixed-positioned antennas arranged along said open path, with abrupt or near-abrupt flybacks between the separate end points of said open path, or with abrupt or near-abrupt reversal of the sense of motion at each of said end points.

c) The process of detection or counting of IDFM or IDFS on a signal that is being received through an in situ, or from a distant, antenna-motion process as just described under b).

d) Demodulation of a frequency-modulated signal in the presence of additive noise near or below the FM noise threshold, or in the presence of relatively strong impulse noise.

e) Transponding, or regeneratively repeating a frequency modulation under conditions of insufficient noise margin.

The methods and apparatus according to this invention capitalize on identifiable differences between the wanted an the unwanted components of a composite modulation. Instantaneous frequency impulses (corresponding to phase steps), short pulses (corresponding to rapid, but not abrupt, phase transitions) and steps are discrete-time waveform occurrences, and as such are very distinguishable and hence removable from other relatively much slower (or narrower-band, though spectrally overlapping/conjoined) modulation waveforms. The discrimination in such cases is based on either discreteness of time of occurrence, or on waveform differences, or on relative bandwidths. Another basis for discrimination is disjointness of frequency spectral bands occupied by the different modulation waveforms.

In addition to providing the capability to extract trackmetric data directly from one-way propagated modulated signal waves, and thereby provide a viable alternative to other methods that may be either unacceptable or unavailable, the methods and apparatus of this invention facilitate the implementation of improved radio navigation-aid systems, air traffic surveillance, guidance and control instrumentation, signal quantity measurement, and antijam and low-threshold detection methods applicable to various types of communication links.

Consider, first, Doppler on an FM signal, due to range rate.

In any type of (Multiplex)/FM, the signal can be expressed in the form $$e(t) = A_c \cos\{\omega_c t + \psi(t)\} \quad (1)$$

where $\omega_c$ is the unmodulated main- or prime-carrier frequency, $A_c$ is presumed constant, and $\psi(t)$ embodies the combination of multiplexed (PAM, PCM, PDM, FM) subchannel signals. We shall refer to (PAM, PCM or PDM)/FM as TDM/FM; and to (FM)/FM, (PAM/FM)/FM, ((...)/FM)/FM, (SSB/FM and (any of the various forms of DSB/FM as FDM/FM.

Under a condition of time-variant radial or slant range, $\rho(t)$, between transmitting and receiving antennas, a signal emitted at instantaneous frequency $\omega_i(t)$ will appear to have an instantaneous frequency $$\omega_{rec} = \omega_i(t)\{1 + u[\dot{\rho}(t)/c]\} \quad (2)$$

where $$\begin{aligned} u[\dot{\rho}(t)/c] &= \text{Function of } \dot{\rho}(t)/c \text{ only} \\ &\simeq \dot{\rho}(t)/c \text{ for } |\dot{\rho}(t)/c| \ll 1 \end{aligned} \quad (3)$$

c is the speed of wave propagation, and $$\omega_i(t)u[\dot{\rho}(t)/c] \text{ is the instantaneous Doppler} \\ \text{shaft} = \{\omega_c + \dot\psi(t)\}u[\dot{\rho}(t)/c] \text{ for } e(t) \text{ of Eq. (1)} \quad (4)$$

This shows that for a sinusoid emitted at instantaneous frequency $$f_i(t) = f_c + \dot\psi(t)/2\pi, \text{ the Doppler shift} = (\text{Doppler Shift} \\ \text{of a Sinewave at } f_c \text{ Hz}) + (\text{Doppler Shift of a} \\ \text{Sinewave at } \dot\psi(t)/2\pi \text{ Hz}) \approx (\text{Doppler Shift of} \\ \text{Sinewave at } f_c \text{ Hz}), \text{ for } |\dot\psi(t)|_{max} \ll \omega_c \quad (5)$$

We refer to the condition in Eq. (5) as the condition for a "high-Q" FM signal.

Accordingly, any "high-Q" signal of the form in Eq. (1)—such as all forms of (FDM or TDM)/FM modulated signal—, received under any condition of Doppler shift, can be approximated very closely by $$\begin{aligned} e_{rec}(t) &\simeq A_c \cos\left\{\omega_c t + \omega_c \int_0^t u[\dot\rho(\eta)/c]d\eta + \psi(t)\right\} \\ &\simeq A_c \cos\{\omega_c t + \omega_c \rho(t)/c + \psi(t)\}, \text{ for } |\dot\rho(t)/c| \ll 1 \end{aligned} \quad (6)$$

Equation (6) expresses how the prime-carrier Doppler shift will be added to the multiplexed telemetry subchannel signals represented by $\psi(t)$.

Two characteristics of the Doppler are of importance to the analyses in this report. These are i) The maximum positive and negative values of the Doppler shift $(f_c/c)\dot\rho(t)$; i.e., $$\begin{aligned} f_{d+,max} &= (f_c/c)|\dot\rho(t)|_{max+}, \text{ and} \\ f_{d-,max} &= (f_c/c)|\dot\rho(t)_{max-} \end{aligned} \quad (7)$$

and ii) The frequency width, or spectral spread, of $$F\{(f_c/c\{\dot\rho(t)\} = j(f_c/c)fR(f)$$

where $$R(f) = F\{\dot\rho(t)\} \quad (8)$$

For the IRIG telemetry S-band of frequencies, 2200–2300 MHz, we set $f_c = 2.3 \times 10^9$ Hz, and note that if $|\dot\rho(t)|_{max\pm} = 2.5$ Km/sec, then the maximum absolute Doppler shift is $$f_{d,max} \approx 19,167 \text{ Hz} \sim 20 \text{ KHz} \quad (9)$$

The Doppler spectral spread is due to the fact that, in general, the geometry and dynamics of the trajectory relative to the receiving platform are such that the range rate $\dot\rho(t)$ has nonzero first and higher derivatives;

i.e., nonzero $\rho(t)$, $\rho^{(3)}(t)$, .... This, of course, ordinarily is implied, or taken into account, by specifying a sampling rate requirement of some number of Doppler-shift measurements per second. The expected maximum Doppler spectral spread may be inferred as nominally (1/5) of the specified sampling rate. For example, if the Doppler shift is counted 20 times/sec (over frequency-counting intervals of duration 40 msec each, plus 10 msec of processing time alloted for each sample), then this can be considered to be sufficient to reproduce a Doppler-shift time function with a positive-frequency spectral width of ~4 Hz.

Analytically, an estimate of the highest frequency of significance in the spectra of $\rho(t)$ and $\dot\rho(t)$ can be determined as follows. First, if it is known that $$|\dddot\rho(t)| \leq \dddot\rho_{max}, \; |\ddot\rho(t)| \leq \ddot\rho_{max}, \; |\dot\rho(t)| \leq \dot\rho_{max} \quad (10)$$

then it follows from basic formulas for bounding band-limited time-domain functions in terms of their frequency-spectral characteristics that $$\dddot\rho_{max} < \omega_{ph}\ddot\rho_{max} < \omega_{ph}^2 \dot\rho_{max} \quad (11)$$

where $\omega'_{ph}$ and $\omega_{ph}$ are the effective upper frequency limits of the spectra of $\dot\rho(t)$ and $\rho(t)$, respectively. Accordingly, $$\text{For } \dot\rho(t), \; \omega'_{ph} = \dddot\rho_{max}/\ddot\rho_{max} \quad (12)$$

and $$\text{For } \rho(t), \; \omega_{ph} = \text{Greater of } \{\sqrt{\dddot\rho_{max}/\dot\rho_{max}} \text{ or } \ddot\rho_{max}/\dot\rho_{max}\} \quad (13)$$

As an illustration, let $\ddot\rho_{max}=2.5$ Km/s, and $\dddot\rho_{max}=1000$ g$\cong$10 Km/s$^2$, then, for $\dot\rho(t)$, $\omega'_{ph}=4$ rad/s.

The fact that the prime-carrier Doppler $$\dot\delta(t) = (\omega_c/c)\dot\rho(t) \quad (14)$$

is simply added to the original multiplex-band composite "video" waveform $\psi(t)$ provides the basis for the techniques for suppressing the interference of $\psi(t)$ with $\delta(t)$, according to this invention.

First, Eq. (6) shows that direct FM demodulation of $e_{rec}(t)$ would yield $$e_d(t) = K_d\{(\omega_c/c)\dot\rho(t) + \psi(t)\} \quad (15)$$

Thus, the measurement of the Doppler component in this output is determined by the degree to which $\psi(t)$ can be rejected by a filter that passes only the frequencies from 0 to $\omega'_{ph}$ rad/sec. For IRIG-standard FDM/FM, the FDM subchannel spectra are such that the spectral density of $\psi(t)$ can be expected to be identically zero over many octaves of the highest likely frequency limit of the prime-carrier Doppler spectral density. Consequently, the Doppler component in Eq. (15) is completely separable from the composite FDM telemetry component.

However, if the telemetry component in Eq. (15) is a TDM composite, then the spectral density of $\psi(t)$ places at least the 0-Hz spectral zone plus, possibly, a number of the lower-frequency zones centered at the frame repetition frequency, $1/T_f$ Hz, and its harmonics, within the Doppler frequency spectral range extending from 0 to $\omega_{ph}$ rad/sec. The fraction of the total multiplex-band (or "video") power overlapping this Doppler spectral range is approximately $$(\omega'_{ph}/2\pi)/(M/T_f) \quad (16)$$

wherein M represents the number of TDM subchannel time-slots within each frame, and $T_f$ is the frame duration. For values of $M/T_f$ on the order of $10^4$ and greater, and upper limits on spectral width of the Doppler of 1 Hz or less, the fraction expressed by (16) is on the order of $-40$ dB or less.

The $1/T_f$-Hz periodicity of the TDM spectral density function, evidenced by the repetition of the spectral zone centered at the $1/T_f$ frequency at center frequencies of 0 Hz and harmonics of $1/T_f$ Hz, offers Doppler-free zones to subtract out the part of the spectral density function of $\psi(t)$ that overlaps the spectral density function of $(\omega_c/c)\dot\rho(t)$ in Eq. (15).

We conclude from the preceding, that the prime-carrier Doppler waveform and the superimposed multiplexed subcarrier channels or video waveform in Eq. (15) are effectively separable by means of linear filtering action because their spectral density functions either do not overlap at all (for FDM) or overlap negligibly (for TDM).

The separability of the prime-carrier Doppler and the multiplexed telemetry waveforms added in the argument of the cos-function in Eq. (6) and in the output of a prime-carrier FM demodulator as expressed in Eq. (15) can be capitalized upon to measure the prime-carrier Doppler by either i) "Analog readings" or "local" averages of the values of the "baseband" Doppler waveform; or ii) A count of frequency shift by the prime-carrier Doppler as conveyed on an IF carrier at a precisely known "bias" frequency.

Measurement of Doppler by operating on an analog "baseband" waveform in the output of a prime (or IF) carrier FM demodulator, extracted from $e_d(t)$ of Eq. (15), is severely limited in potential precision. Much greater precision can be accomplished by counting the Doppler as a shift of the frequency of a sinusoidal carrier.

Clearly, if a sinusoid with time dependence completely and accurately represented by cos $\{\omega_c t + (\omega_c/c)\rho(t)\}$ can be reliably identified in the "spectrum" of the signal of Eq. (6) in time-frequency plane, its separation with negligible interference from the other parts of the signal plus receiver noise spectrum would provide a Doppler-modulated sinewave whose frequency can be counted as an essential step to determine the one-way Doppler.

In general, such a purely Doppler-shifted carrier cannot be extracted from $e_{rec}(t)$, Eq. (6), as is, because almost all of the energy in $e_{rec}(t)$ resides in the sidebands, it being diverted there from the desired carrier component at $\omega_c\{1+\dot\rho(t)/c\}$. At IF, what is left as a prime-carrier Doppler-shifted component at $\omega_{if}+(\omega_c/c)\dot\rho(t)$ is at a very vulnerably low level, burried in a morass of nonlinear spectral by-products of the telemetry modulation, in addition to the receiver noise. This is brought out by first rewriting $$\begin{aligned} e_i(t) &= \cos\{\omega_{if}t + \delta(t) + \psi(t)\} \\ &= Re\{e^{j\{\omega_{if}t+\delta(t)\}} \cdot e^{j\psi(t)}\} \end{aligned} \quad (17)$$

The effect of the frequency modulation by telemetry is embodied in $e^{j\psi(t)}$, which is a nonlinear function of $\psi(t)$, expressible as $$e^{j\psi(t)} = 1 + j\psi(t) - \frac{1}{2}\psi^2(t) - j\frac{1}{3!}\psi^3(t) + \ldots \quad (18)$$

The even powers each contributes a 0-Hz component, some subtracting from, some adding to the first term on the right-hand-side of Eq. (18), with an excess of subtraction. The odd powers contribute terms in $\psi(t)$ and harmonics of the frequency components of $\psi(t)$. each of the higher-than-the-first powers of $\psi(t)$ contributes cross-products of the components of $\psi(t)$ that will fall in the range of frequencies near 0 Hz. The net effect on the term that determines the carrier component is that it drops below 1, becoming $$1 - \left(\frac{1}{2}\beta\right)^2 + \frac{\left(\frac{1}{2}\beta\right)^4}{1^2 \cdot 2^2} - \frac{\left(\frac{1}{2}\beta\right)^6}{1^2 \cdot 2^2 \cdot 3^2} + \ldots = J_0(\beta),$$

for $\psi(t) = \beta\cos\omega_m t$ where $J_0(\beta)$ is the Bessel function of the first kind, 0 order and argument $\beta$. More generally, for $\psi(t)$ representing a sample function of a gaussian random process, the term that determines the carrier component in the expansion of Eq. (18) becomes $e^{-\sigma_\psi^2/\omega_l\omega_u}$, for $\{\psi(t)\}$ with a spectral density that is identically zero outside of $\omega_l \leq |\omega| \leq \omega_u$ \quad (19)

and, for a bounded $\sigma_\psi^2$, the power spectral density function of $e^{j\psi(t)}$, expanded as in Eq. (18), is given by $$S_{exp\,j\psi} = e^{-\sigma_\psi^2}\{u_o(f) + \sigma_\psi^2 S_\psi(f) + (\sigma_\psi^4/2!)\{S_\psi(f)\otimes S_\psi(f)\} + (\sigma_\psi^6 3!)\{S_\psi(f)\otimes S_\psi(f)\otimes S_\psi(f)\} + \ldots\} \quad (20)$$

where $u_o(f)$ is a unit impulse at $f=0$, $S_\psi(f)$ is the power spectral density of the random process $\{\psi(t)\}$, and $\otimes$ denotes convolution. The effect of the convolution terms in Eq. (20) is to fill in the vacant frequency range around 0 Hz where $S_\psi(f)$ is zero, and to spread the signal power well beyond the highest frequency of significance in $S_\psi(f)$.

Subtraction, compression or suppression (rejection) of $\psi(t)$ from the instantaneous phase of the signal in Eqs. (6) and (17) would return all or most of the sideband power back to the prime-carrier Doppler-shifted component, thus enhancing/restoring this carrier to a level at which it packs all or most of the total signal power present. This would greatly facilitate the separation of this Doppler carrier with a ratio of (Carrier Power)/(Attendant Noise and Remnant Sideband Power) at the maximum available level, for frequency counting. A technique for accomplishing this will henceforth be called a Doppler-Shifted Carrier Extractor, DSCE for short. In effect, a DSCE must a) Return all power in the sidebands caused by the FM due to telemetry on the incident signal to the Doppler-shifted carrier component;

b) Linearize the exponent modulation due to telemetry, by reducing the level of this modulation sufficiently to render the second- and higher-power terms on the right-hand-side of Eq. (18) negligible;

c) Reduce the remnant $\psi(t)$ sideband spectral density to a negligible level within the band of the prime-carrier Doppler spectral spread width.

The DSCE mechanisms according to the present invention, singly and in combinations, comprise i) Subtracting out the source-applied frequency modulation;

ii) Compressing the level of said frequency modulation; and iii) Causing the incident signal to impart the prime-carrier Doppler to a controlled oscillator of a priori known free-running frequency, thus synthesizing a replica of the Doppler-shifted prime-carrier, with said frequency modulation suppressed.

The general architecture of the feedforward modulation subtractive (henceforth FFMS) DSCE is illustrated in FIG. 1. Basically, the signal is first channeled through two parallel, forward Branches A and B. In Branch A, the modulation is essentially not altered, save for a uniform group delay adjustment. In Branch B, the signal is operated on to suppress the prime-carrier Doppler and retain only the source-applied or original modulation of the carrier. The outputs of the two Branches are then multiplied in 3 to effect the subtraction/cancellation of the original modulation. One implementation according to the present invention is illustrated in FIG. 2.

Figure 2:
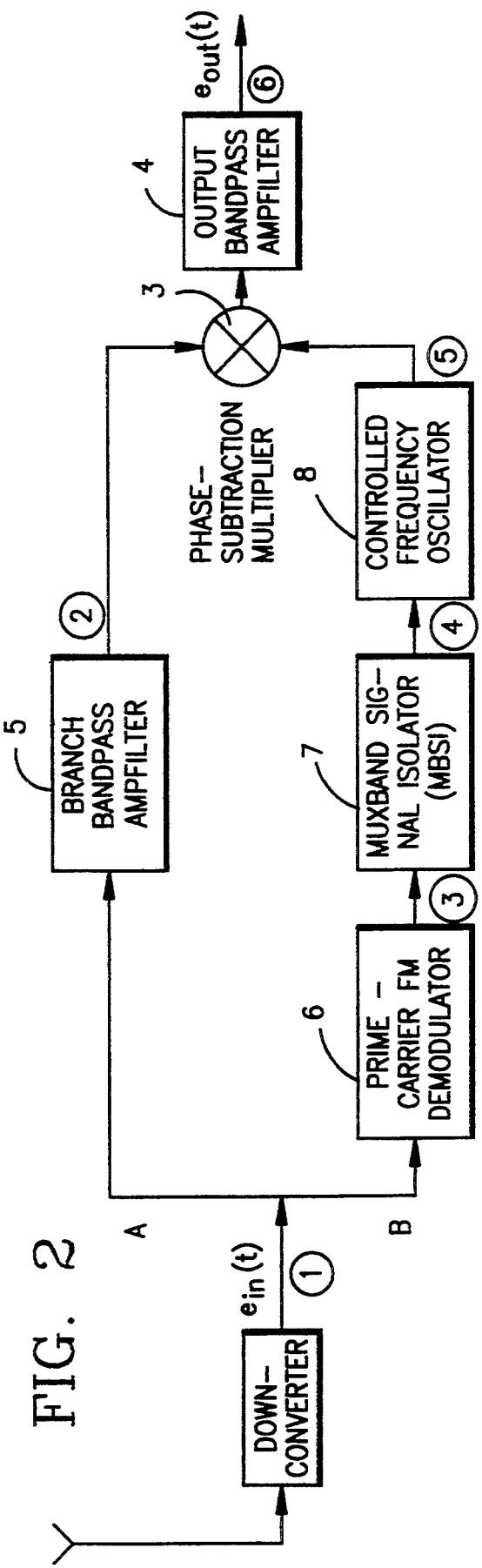
FIG. 2 illustrates one particular embodiment of the method of FIG. 1.

Inspection of FIG. 2 reveals that the accuracy of the source-applied modulation subtraction is limited by differences between the two parallel branches in a) Phase/frequency modulation waveform levels at the point of subtraction in 3;

b) Group delays between the common input and Block 3 inputs;

c) Types and degrees of nonlinearities (e.g., in phase vs. frequency response of Block 5, in the detection characteristic of Block 6, in the processing operations of Block 7, in the frequency modulation characteristics of Block 8);

d) Accuracy of reproduction of the original source-applied modulation waveform over the frequency range of the likely prime-carrier Doppler-spectrum spread.

Figure 3:
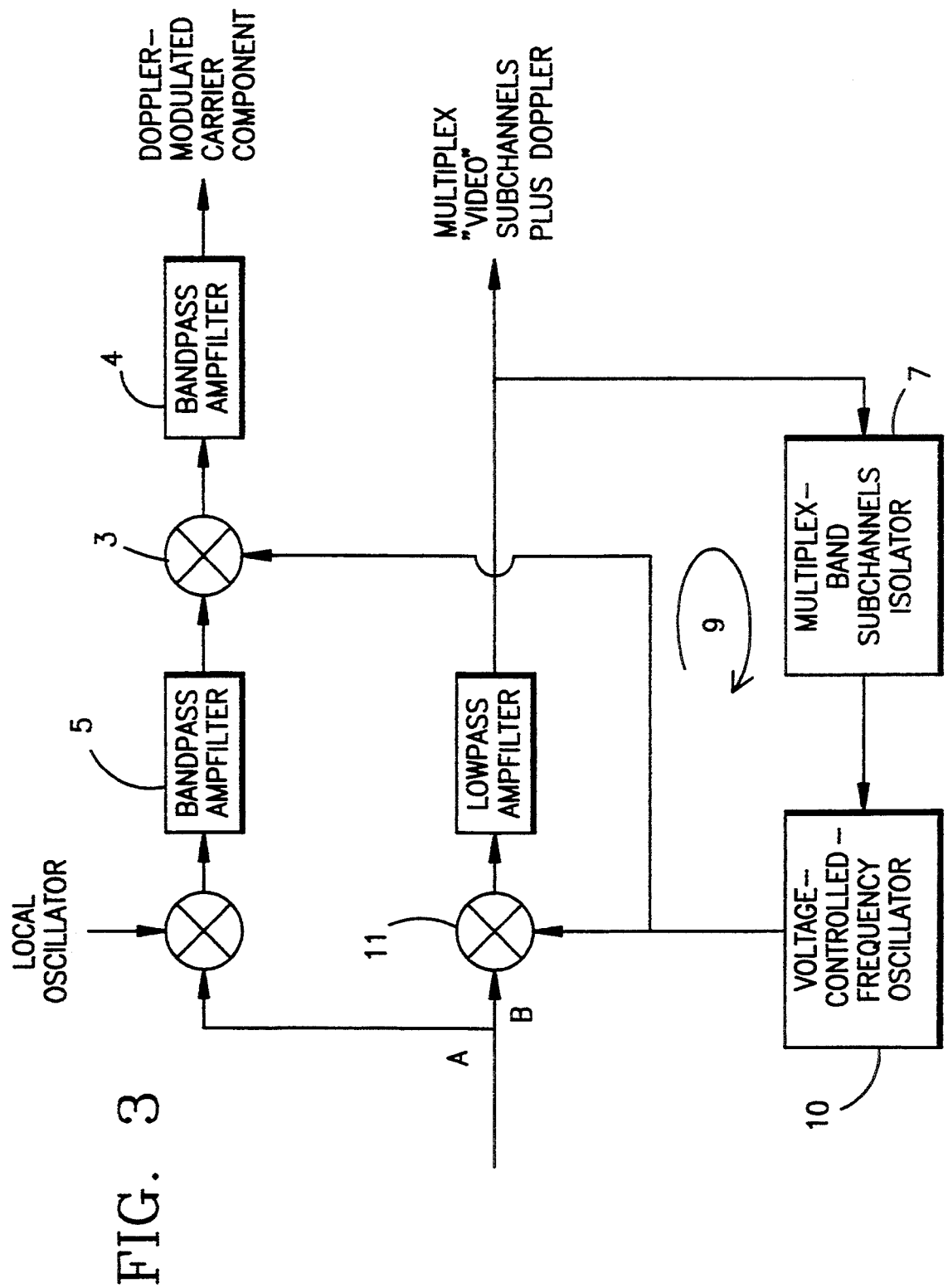
FIG. 3 illustrates another particular embodiment of the method of FIG. 1, which utilizes a frequency-following automatic phase control (FFAPC) loop to perform the function of Branch B in FIG. 1.
Figure 4:
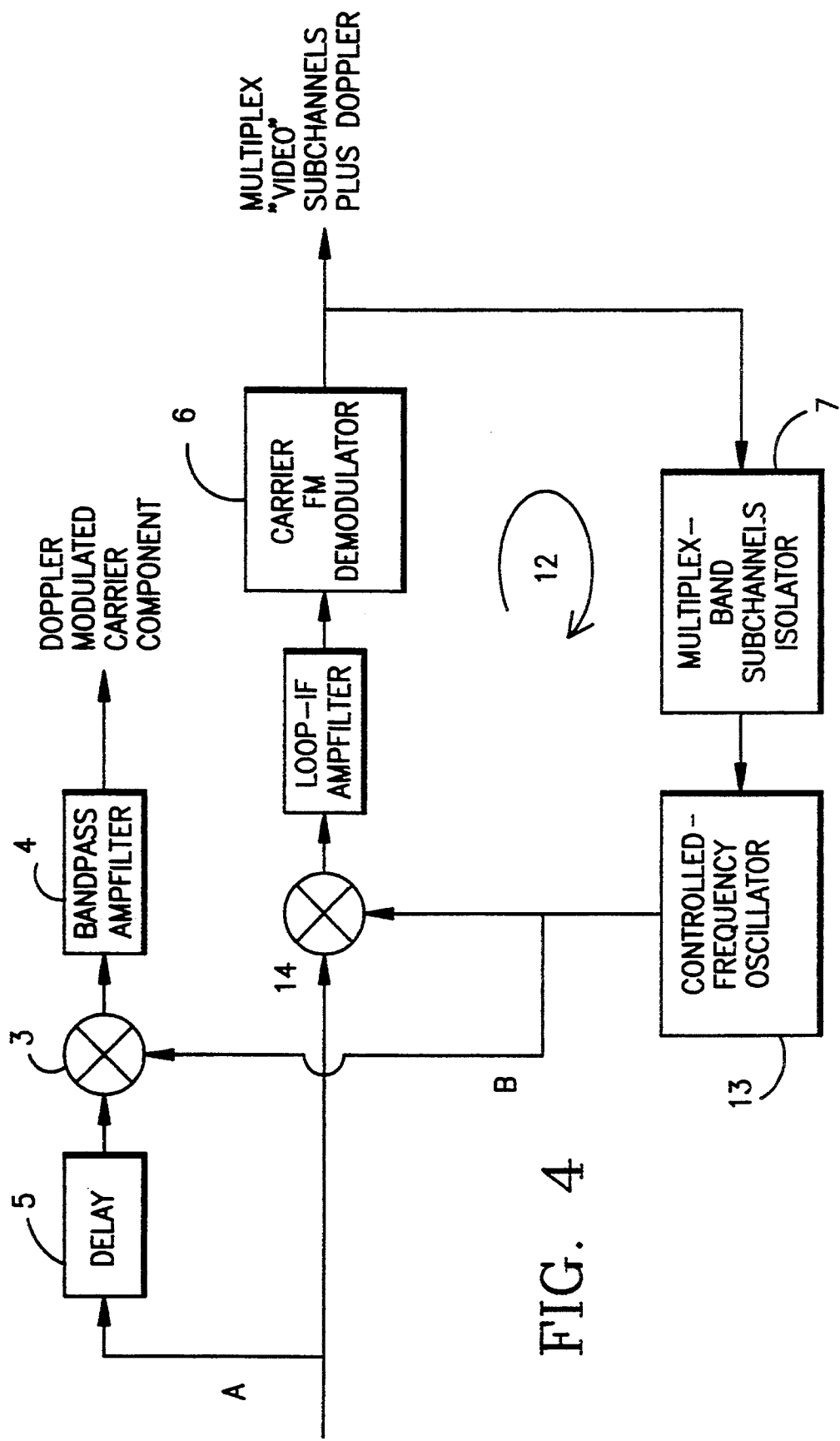
FIG. 4 illustrates yet another paticular embodiment of the method of FIG. 1, which utilizes an automatic frequency-following control (AFFC) loop for performing the function of Branch B in FIG. 1.
Figure 5:
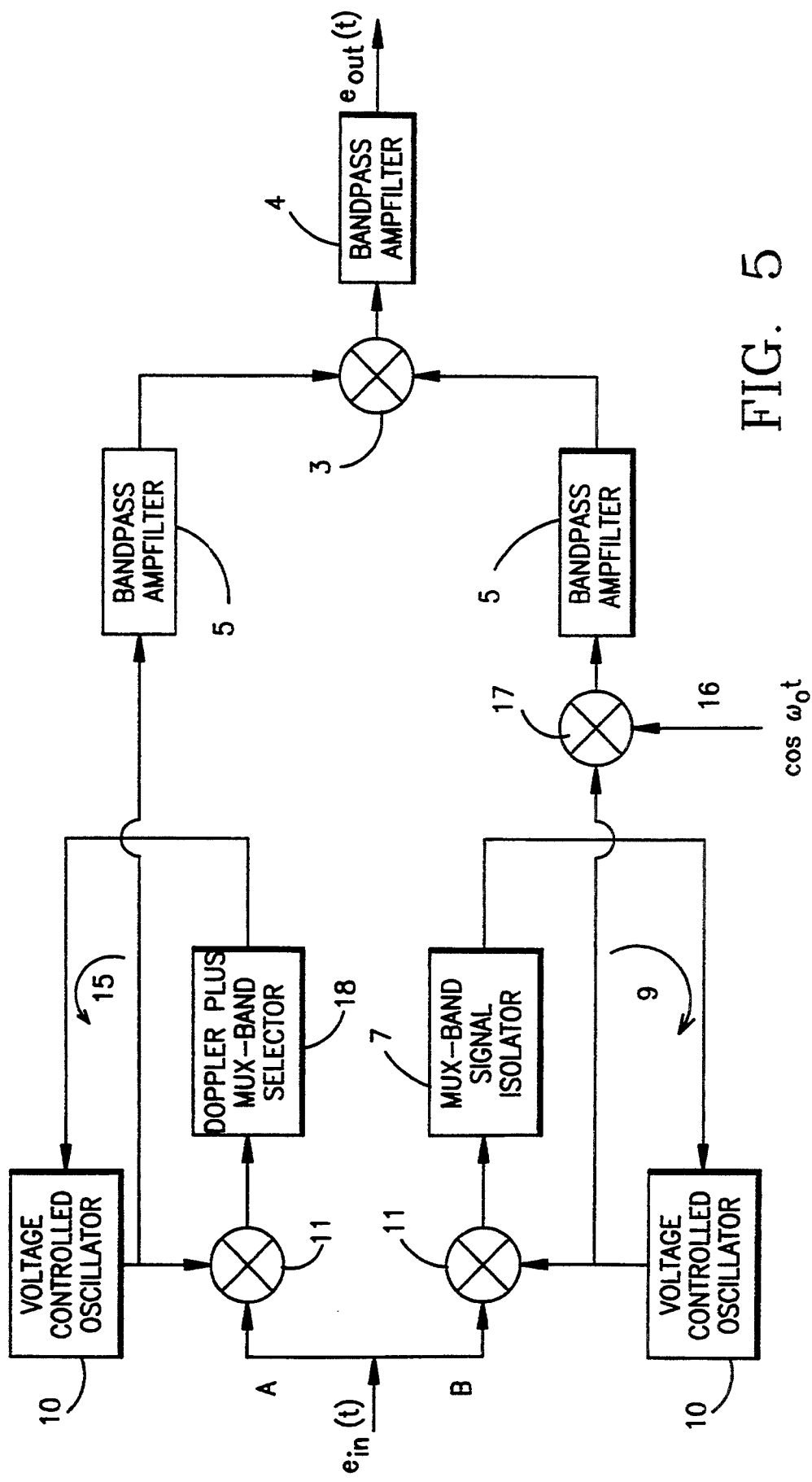
FIG. 5 illustrates yet another embodiment of the method of FIG. 1 wherein maximal symmetry between Branches A and B is achieved by utilizing FFAPC loops to perform their respective functions.

Differences between Branches in any of these can be minimized, according to the present invention, in a number of ways. First, said nonlinearities in Block 5 can be arranged by design to balance out or to be balanced out by said nonlinearities in Blocks 6 and 8. Alternatively, cause a) can be addressed very effectively by embodiments of this invention such as are illustrated in FIGS. 3, 4 and 5. Causes a), b) and c) are addressed collectively by a maximally symmetrical implementation structure, such as the embodiment of this invention illustrated in FIG. 5. Cause d) is common to all implementations, since it relates to the MBSI, Block 7, and it is addressed effectively by the MBSI methods to be described below.

In the embodiment of this invention shown in FIG. 3, Branch B of FIG. 1 comprises a frequency-following automatic phase control (henceforth FFAPC) loop. In FIG. 4, said Branch B is implemented in the structure of an automatic frequency-following control (AFFC) loop (so-called because the controlled oscillation is the output).

Examination of FIG. 5 shows that causes a) and c) are addressed simultaneously by parallel FFAPC's designed to have identical loop gains and frequency demodulation ("phase detectors", 11) and remodulation (VOLTAGE-CONTROLLED OSCILLATORS, 10) characteristics. The loop low-frequency filters 7 & 18 can be designed to have identical group delays, which is necessary for addressing cause b). Cause b) is further addressed by employing branch BANDPASS AMPLIFILTERs 5 that (except for center frequencies) have identical phase-vs-frequency (deviation from center) response characteristics.

The output BANDPASS AMPLIFILTER 4 may take a variety of forms. Basically, this filter should limit the passed frequencies only to those within the prime-carrier Doppler-modulation spectral range. This range is ordinarily less than ±100 Hz. A filter Q of $10^2$ to $10^3$ necessitates a center frequency of $10^4$ to $10^5$ Hz. Thus, avoidance of excessively high Q requires that $\omega_{if}$ be low. Barring a sufficiently low $\omega_{if}$ out of the MULTIPLIER 3 because of design restrictions in the FFMS structure, a time-variant signal-frequency-controlled narrow-pass filter is preferred over an excessively high-Q, fixed-tuned filter. Alternatively, a two-stage operation may be employed in which the frequency-difference component out of MULTIPLIER 3 is first isolated by a bandpass filter of much wider than desired bandwidth centered at $\omega_{if}$. This is followed by a downconversion to the appropriately narrow passband of a high-Q bandpass filter that may either be fixed-tuned or may be signal-controlled, adaptively tuned, such as a frequency-counting digital phase-lock loop (henceforth PLL), or a regular analog PLL.

With regard to Block 7, FIGS. 2, 3, 4 and 5, marked MULTIPLEX-BANDS SIGNAL ISOLATOR, or MBSI for short, there are three methods according to the present invention for carrying out this function: 0-Hz Notch Filter, Reconstructive/Synthetic Canceller, Proxy Subtractor.

The 0-Hz Notch Filter comprises a video (baseband for a single-channel, multiplex-band for a multi-channel signal) filter with a narrow rejection band centered at 0 Hz that rejects the prime-carrier Doppler waveform, $(\omega_c/c)p(t)$, in the output of the PRIME-CARRIER FM DEMODULATOR (Block 6 in FIGS. 2 and 4, and 11 in loop 9 in FIGS. 3 and 5). Such a filter is suited to single-channel FM, FDM/FM and TDM/FM/FM signals in view of the fact that, with such signals, the prime-carrier Doppler spectrum is not overlapped by the single-channel baseband or the FDM multiple subchannels. Moreover, considering that the rejection band around 0 Hz may be restricted to a few tens of Hz, the Notch-Filter MBSI may also be used for TDM/FM signals, in which case it will eliminate one or more of the spectral zones at and near 0 Hz that completely overlap the prime-carrier Doppler spectrum. One can then either ignore this loss of TDM spectral zones and accept a corresponding error penalty in the ultimate subtraction of the original source-applied modulation, or compensate for this loss prior to the subtraction.

In a TDM/FM signal, a number of low-frequency spectral zones at and near 0 Hz overlap and mask the prime-carrier Doppler spectrum totally. Since the spectrum of an information waveform modulating a periodic pulse train repeats at zones centered at multiples of the sampling (or pulse repetition) frequency (which, for one sample per TDM frame, is the same as the frame rate), one can contemplate eliminating the prime-carrier Doppler masking TDM low-frequency, circa-0 Hz spectral zones altogether in order to ensure the removal of the prime-carrier Doppler modulation, and thereafter reconstituting the eliminated TDM spectral zones by frequency-translating down to the emptied band an appropriate number of the retained higher-frequency zones. This is the reconstructive/synthetic method for multiplex-band signal isolation, which is illustrated in FIG. 6.

Figure 6A:
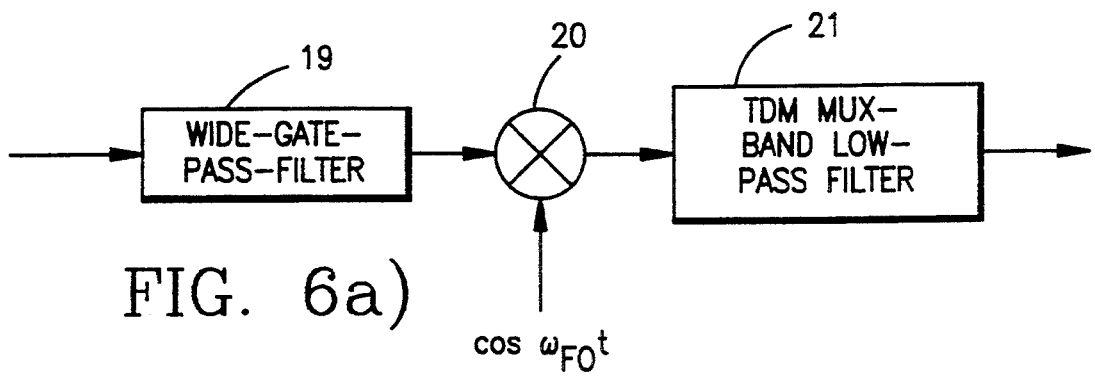
FIG. 6 illustrates a method of reconstructing, for the ultimate subtraction, a part of the spectrum of an undesired pulse modulation waveform rejected in the process of suppressing a desired baseband component.
Figure 6B:
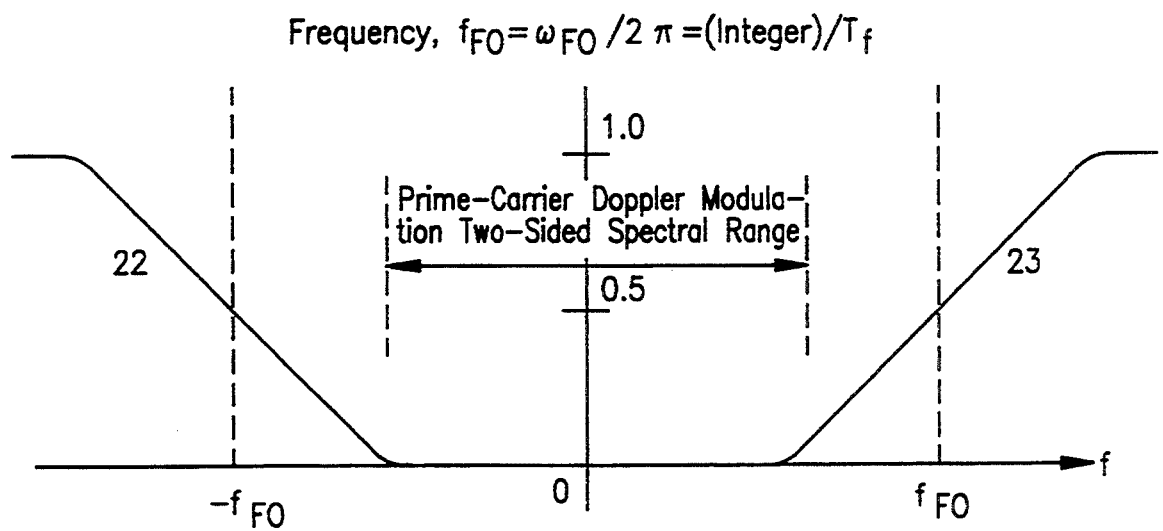
Figure 6C:
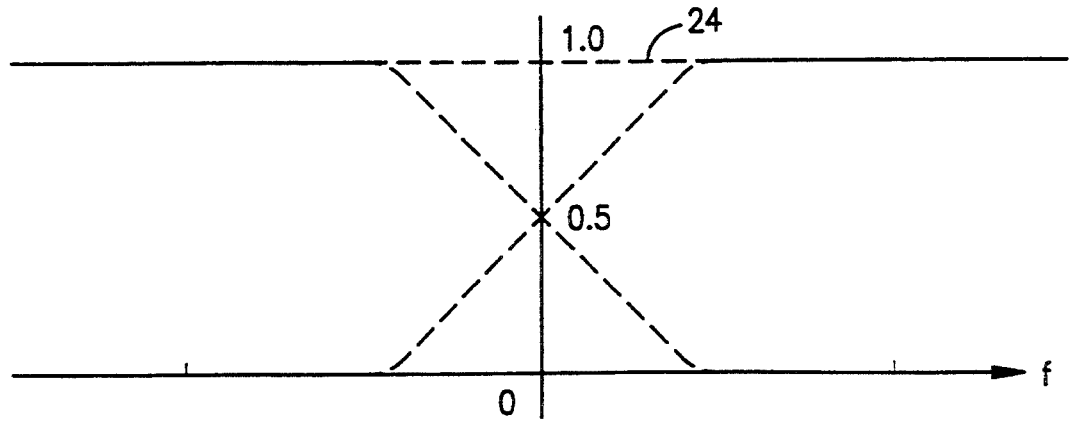

As a practical matter, the low-frequency cut-off skirt, 22 and 23, of the wide-gate-pass filter 19 in FIG. 6 is best designed so that upon translation of this frequency down to 0 Hz, the resulting fold-over of this curve about 0 Hz will result in a flat frequency response (24 in FIG. 6) down through 0 Hz. In this way, the cutoff weighting imposed upon the TDM spectrum over the range of the prime-carrier Doppler spectrum folds over in precisely the manner required to restore the TDM spectrum over that frequency range.

Figure 7:
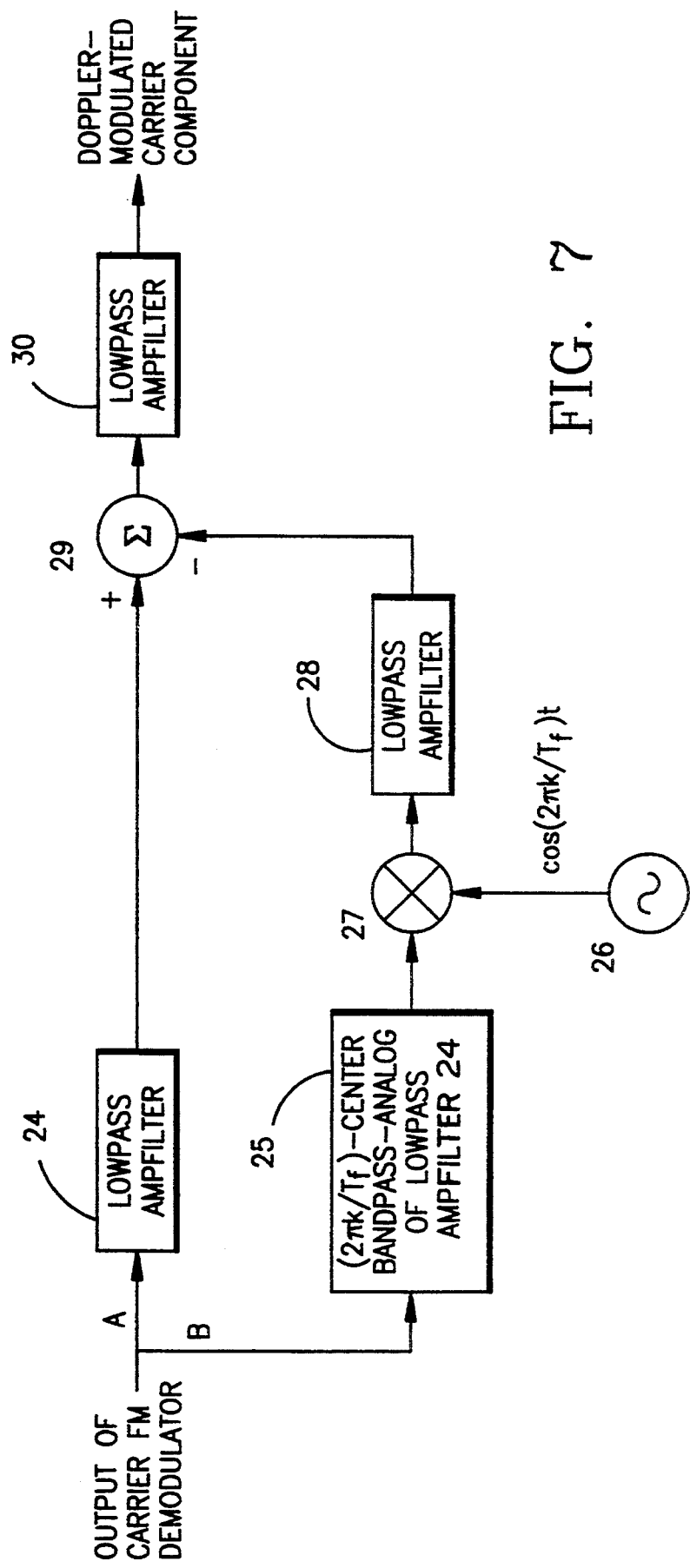
FIG. 7 illustrates a method of synthesizing the part of a pulse modulation component that may overlap the desired frequency modulation component spectrally, according to this invention.

The Proxy Subtractor MBSI according to this invention is illustrated in FIG. 7. With reference to FIG. 7, LOWPASS AMPFILTER Block 24 passes the prime-carrier Doppler spectral band around 0 Hz through a flat passband, together with the overlapping part of the $p(t)$ spectrum. BANDPASS-ANALOG FILTER 25 extracts a bandpass-analog replica of the output of Block 24, free of prime-carrier Doppler, which is then translated down to a 0 Hz center frequency by the coherent product process carried out by means of Blocks 26, 27 and 28, and the result is subtracted in Block 29 from the output of Block 24.

Figure 8:
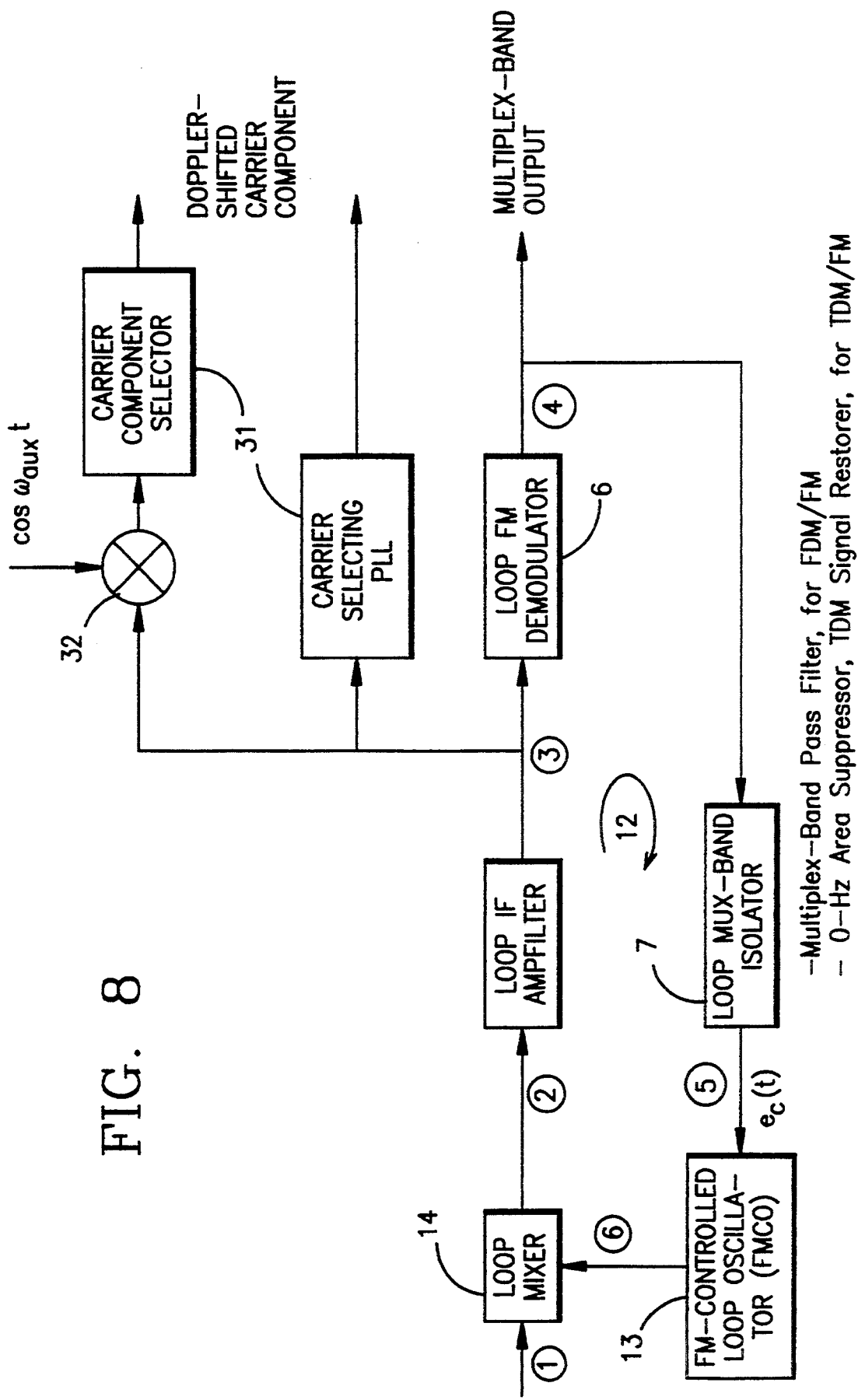
FIG. 8 illustrates alternative methods of deriving a sinusoid carrying only the desired frequency modulation component uncompressed from the loop IF of a frequency modulation compressing feedback (FMCF) loop.

A generic carrier frequency-modulation compressive feedback (FMCF) loop DSCE is illustrated in FIG. 8. (This is the same as Loop 12 of FIG. 4, except that the LOOP IF output ③ is now taken as the desired output because it carries the modulation compressed.) The purpose of the FMCF action here is to enhance the Doppler-shifted prime-carrier component into predominance over the FM sidebands by compressing, by a large factor, only the prime-carrier FM deviation due to the source-applied modulation. If the compression is such as to reduce the root mean square deviation ratio down to less than $\pi/10$, the Doppler-shifted prime-carrier component will emerge with more than 91% (or within 0.82 dB) of the total signal power, with the balance spread out over approximately twice the width of the multiplex band. The Doppler-shifted prime-carrier component may then be extracted, after initial restriction of the bandwidth to no more than ±(a few kHz) about the loop IF center frequency, by a frequency-counting digital PLL; or by an analog PLL; or, after further stable down-conversion (Block 32) to a frequency of a few tens of kHz, by a fixed-tuned filter or a PLL in Block 31.

In order that only the source-applied FM be compressed, and the prime-carrier Doppler-shift modulation be completely preserved without change of scale, the Doppler-shift modulation must be excluded from the control signal, $e_c(t)$. This is ensured by designing the LOOP MULTIPLEX-BAND SIGNAL ISOLATOR (MSBI) 7 in accordance with the principles and guidelines presented above.

Inspection of the block diagram of FIG. 8 reveals that the accuracy with which the Doppler-shift modulation is presented to the frequency counter is determined in the FMCF approach by the degree of non-Doppler modulation compression, by the effective "noise" bandwidth of the post-compression "carrier" selector (Blocks 31), and by the compressed and reduced spectral density of the non-Doppler modulation sidebands.

Analysis shows that if $G_l$ represents the open-loop gain of the FMCF loop, then the modulation component affected will be compressed by a factor of $(1+G_l)$.

Explicit expressions of the effects of the FM compression for FDM and TDM are presented as follows. We first let the composite of multiplexed telemetry subchannel signals be modeled by a gaussian random process (an admissible model for FDM and at least for PAM-TDM). Then a spectral analysis of the signal expressed by Eq. (1) leads to the following results:

A. FDM

For FM with a modulation spectrum that is identically zero for $0 \leq |\omega| < \omega_l$ and $|\omega| > \omega_u$ (i.e., outside of the range $\omega_l \leq |\omega| \leq \omega_u$), Before Compression (Average Power in Prime-Carrier Component)=(Total Signal Average Power)$e^{-\sigma_\psi^2/\omega_l\omega_u}$ (21)

(Average Power in Sidebands)=(Total Signal Average Power)$\{1-e^{-\sigma_\psi^2/\omega_l\omega_u}\}$ (22)

$\sigma_\psi^2$=Mean-Square Frequency Deviation of Prime-Carrier by Source Modulation (23)

After Compression of $\sigma_\psi$ by Factor of $(1+G_l)$ (Average Power in Prime-Carrier Component) = (Total Signal Average Power)$e^{-\sigma_\psi^2/\{1+G_l\}\psi_l\psi_u\}^2}$ $$\approx \text{(Total Signal Average Power)} \left( 1 - \frac{\sigma_\psi^2}{(1 + G_l)^2 \omega_l^2 \omega_u^2} \right), \quad (24)$$

for $\sigma_\psi/\{(1 + G_l)\omega_l\omega_u\} \leq 0.14$ $\gtrsim 0.99$(Total Signal Average Power), (25)

for $\sigma_\psi/\{(1 + G_l)\omega_l\omega_u\} \leq 1/10$

For FDM, sidebands will be totally rejected by a PLL or other selector of the Doppler-shifted prime-carrier component to be tapped off at point ③ in FIG. 4.1, within a bandwidth restricted to the frequency range of the Doppler-modulation spectrum.

B. TDM

For FM by pulse modulation or by TDM, with a video spectrum wherein the non-discrete (i.e., continuous) part of the spectral density zone centered at 0 Hz is equal to zero at 0 Hz (but, otherwise, a nonzero discrete component, a d-c term, is allowed there), Before Compression (Average Power in Prime-Carrier Component)=(Total Signal Average Power)$e^{-\sigma_\psi^2/(4M/T_f)^2}$ (26)

(Average Power in Sidebands)=(Total Signal Average Power)$\{1-e^{-\sigma_\psi^2/(4M/T_f)^2}\}$ (27)

where M=number of multiplexed subchannels, $T_f$=frame duration, and $\sigma_\psi^2$=Mean-Square Frequency Deviation of Prime-carrier by the TDM Subchannels After Compression of $\sigma_\psi$ by Factor of $(1+G_l)$ Compression of the frequency deviation by a factor of $(1+G)$ reduces the exponents in Eqs. (26) and (27) by the square of this factor. Let $$\delta = \frac{\sigma_\psi}{(1 + G_l)(4M/T_f)} \quad (28)$$

If $(1+G_l)$ is sufficient to result in $\delta < 0.14$, then (Average Power in Prime-Carrier Component, $P_{pc}$)≈(Total Signal Average Power, $P_s$)$(1-\delta^2) \gtrsim 0.99 P_s$, for $\delta \leq 0.1$ (29)

(Average Power in Sidebands, $P_{sb}$) = $P_s\delta^2$ (30)

$\lesssim P_s/100$, for $\delta \leq 0.1$

The average power in the remnant sidebands is spread out over the entire range of frequencies occupied by the TDM subchannels, here nominally estimated to be $4M/T_f$ Hz. If the prime-carrier Doppler-modulation spectrum is expected to extend over $\beta_{dop}/T_f$ Hz, then the sideband power that will disturb the Doppler measurement will be $\lesssim P_s\delta^2/(\beta_{dop}/4M)$ (31)

and the ratio of carrier average power to retained-sideband average $(P_{pc}/P_{sb})=(1-\delta^2)/\}\delta^2\beta_{dop}/4M\}$ (32)

if, for illustration, $\beta_{dop}=(M/4)/T_f$, then $(P_{pc}/P_{sb}) \gtrsim 16(1 - \delta^2)/\delta^2 \approx 16/\delta^2$ (33)

$\gtrsim$ 32dB, for $\delta \leq 0.1$

FMCF can be applied to facilitate reliable, effective FFMS, and FFMS can be applied to "mop up" insufficiently compressed sideband remnants in the IF output of the FMCF, according to this invention.

Figure 9:
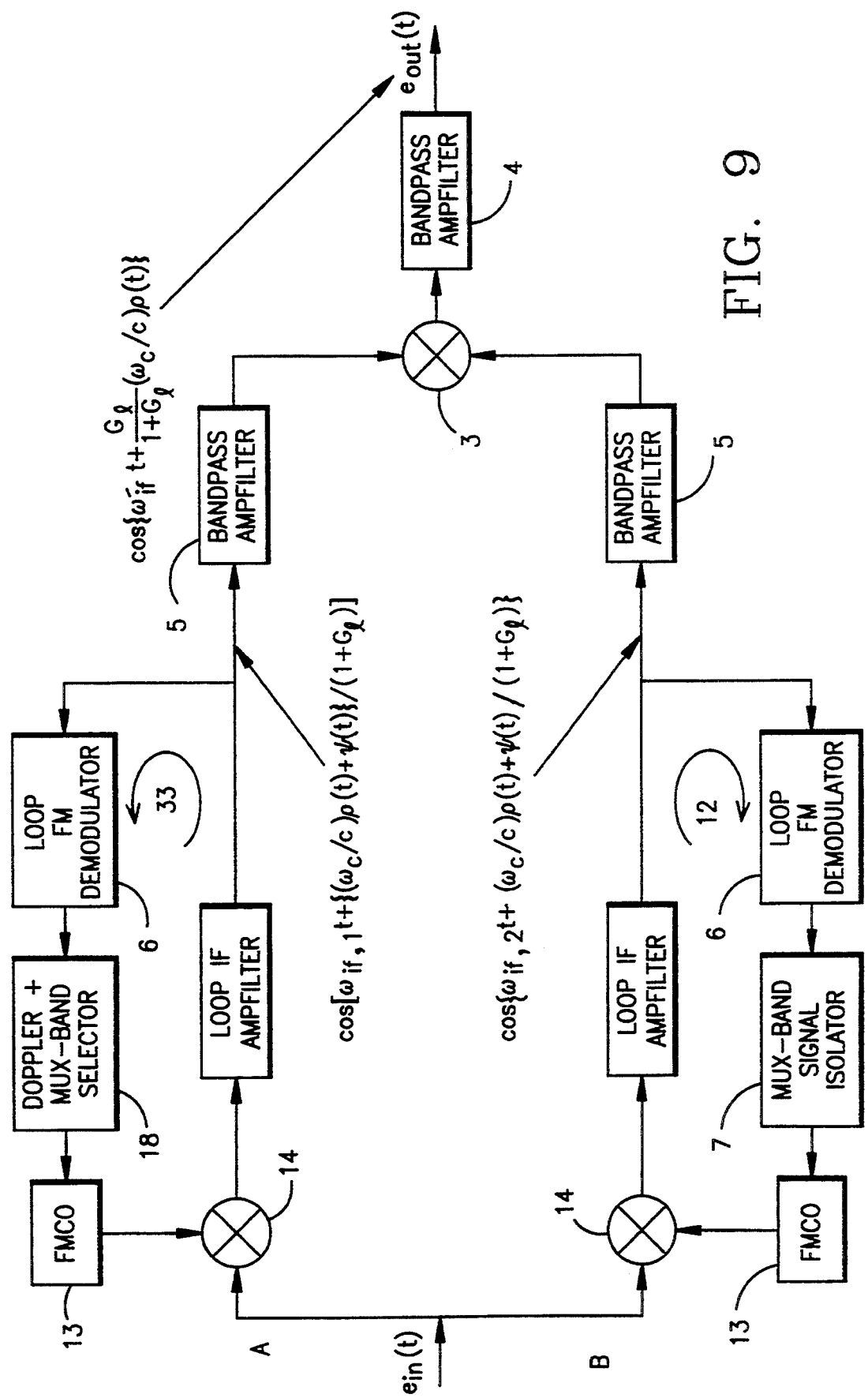
FIG. 9 illustrates yet another embodiment of the method of FIG. 1 wherein maximal symmetry between Branches A and B is achieved by utilizing FMCF loops to perform their respective functions.

A maximally symmetrical FFMS structure employing FMCF loops is shown in FIG. 9. This structure addresses all of the design concerns discussed earlier, where an alternative structure (FIG. 5) employing frequency-following automatic phase control (FFAPC) loops was described. In comparing the use of FMCF vs. FFAPC loops, one should consider that, outside of circuit details, the two differ in that the modulation level is compressed with FMCF prior to the subtraction, whereas in the FFAPC implementation the FM by telemetry is still in full swing at the inputs of the subtraction. This difference is significant because the subtraction can be expected practically to be more effectively realizable—i.e., the residue due to imperfect subtraction conditions will be smaller—if the modulation level is first reduced prior to subtraction.

As a practical matter, the accuracy of a subtraction is ultimately measurable by a parcentage of the magnitude of the quantity being subtracted (e.g., 1% or 0.5%) which (percentage) is independent of said magnitude. If this independence can be assumed, it follows that the lower the level of the modulation being subtracted at the inputs to the subtractor, the smaller the residual error from imperfect subtraction. The lower bound on percentage error in a subtraction process will, however, depend in part on the (complexity, operating characteristics, parametric stability of) operations preparatory to the ultimate subtraction. Analysis of FMCF shows that the inverse feedback in effect immunizes the compression performance to the major potential causes of degradation of the subtraction of the source-applied modulation.

Figure 10:
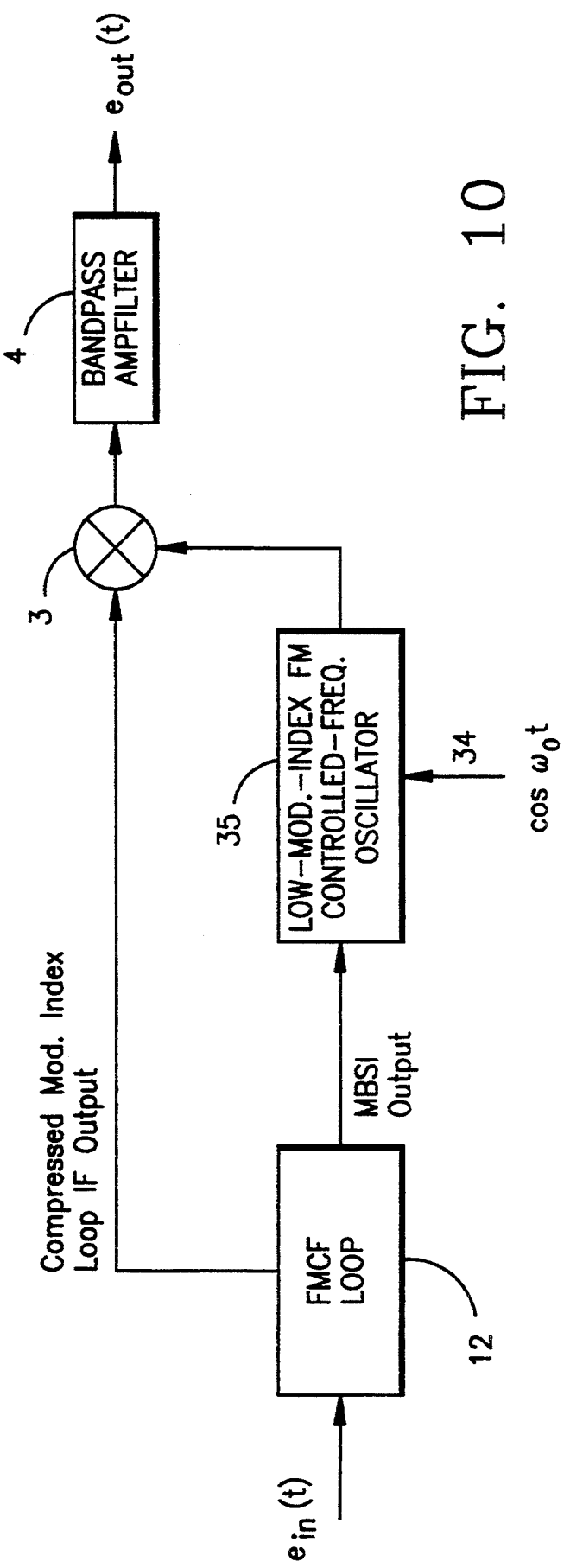
FIG. 10 illustrates yet another embodiment of the method of FIG. 1 based on a single FMCF loop.

In another embodiment of the present invention, illustrated in FIG. 10, the compressed (but not eliminated) remnants of the source-applied modulation as they appear in the FMCF loop 12 Loop-IF output are "mopped up" by using the Loop-MBSI output to generate in Block 35 a low-deviation FM signal on a different carrier frequency, which is then combined with said Loop-IF output in Multiplier 3 to effect the subtraction of said remenants.

A generic prime-carrier frequency modulation suppressive feedback (FMSF) loop is illustrated in FIG. 11. The overall structure of an FMSF loop is very similar to the structure of the FMCF loop of FIG. 8. However, in contrast with the FMCF application of this feedback structure, the purpose of the feedback action is not to impart the prime-carrier Doppler-shift modulation, $(\omega_c/c)p(t)$, to a DOPPLER-CONTROLLED OSCILLATOR, free of, or at worst tolerably disturbed by, remnants of the suppressed source-applied modulation sidebands.

Thus, in FMSF, the control signal, $e_c(t)$, is derived from the LOOP FM DEMODULATOR output by excluding the source-applied multiplex subchannel signals, rather than the prime-carrier Doppler. The DOPPLER-CONTROLLED OSCILLATION now conveys the prime-carrier Doppler-shift modulation and is therefore taken as the output of the loop.

For FDM/FM signals, the feedback-path LOOP DOPPLER ISOLATOR is simply a lowpass filter that passes only the Doppler-shift waveform, $(\omega_c/c)p(t)$, and suppresses all of the source-applied multiplex subchannels, if the Doppler-shift spectrum (i.e., the spectrum of the range rate $p(t)$) is expected to be always confined to the frequency range (centered at 0 Hz, of course) below the lowest-frequency subchannel. If the Doppler spectrum is likely to overlap any of the subchannels, then the feedback-path LOOP DOPPLER ISOLATOR should be modified to have notches that suppress the overlapped channels.

Figure 11A:
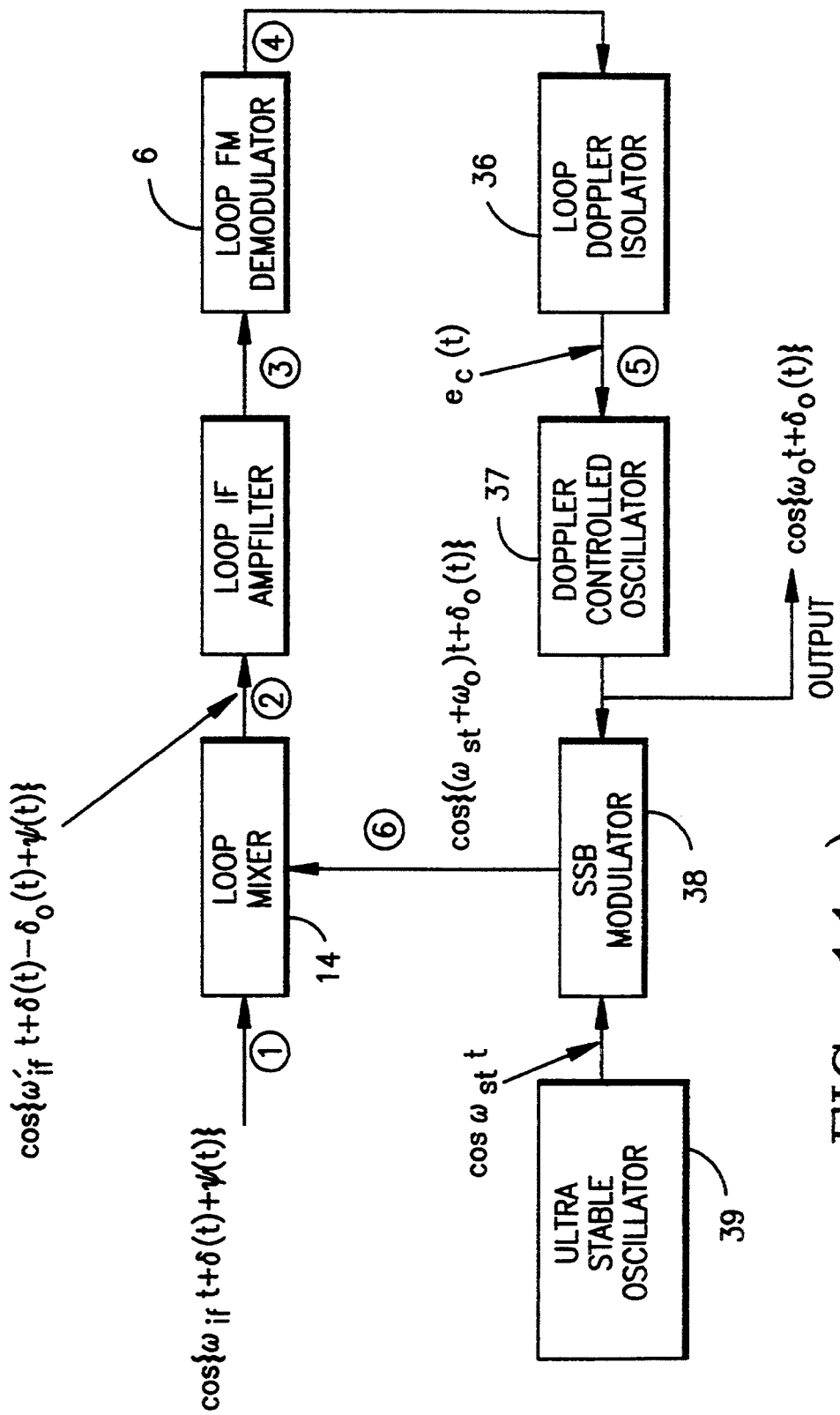
FIG. 11 is an illustration of yet another embodiment of the method of FIG. 1 which utilizes an AFFC loop wherein the loop oscillator frequency is slaved to follow only the desired frequency modulation component.
Figure 11B:
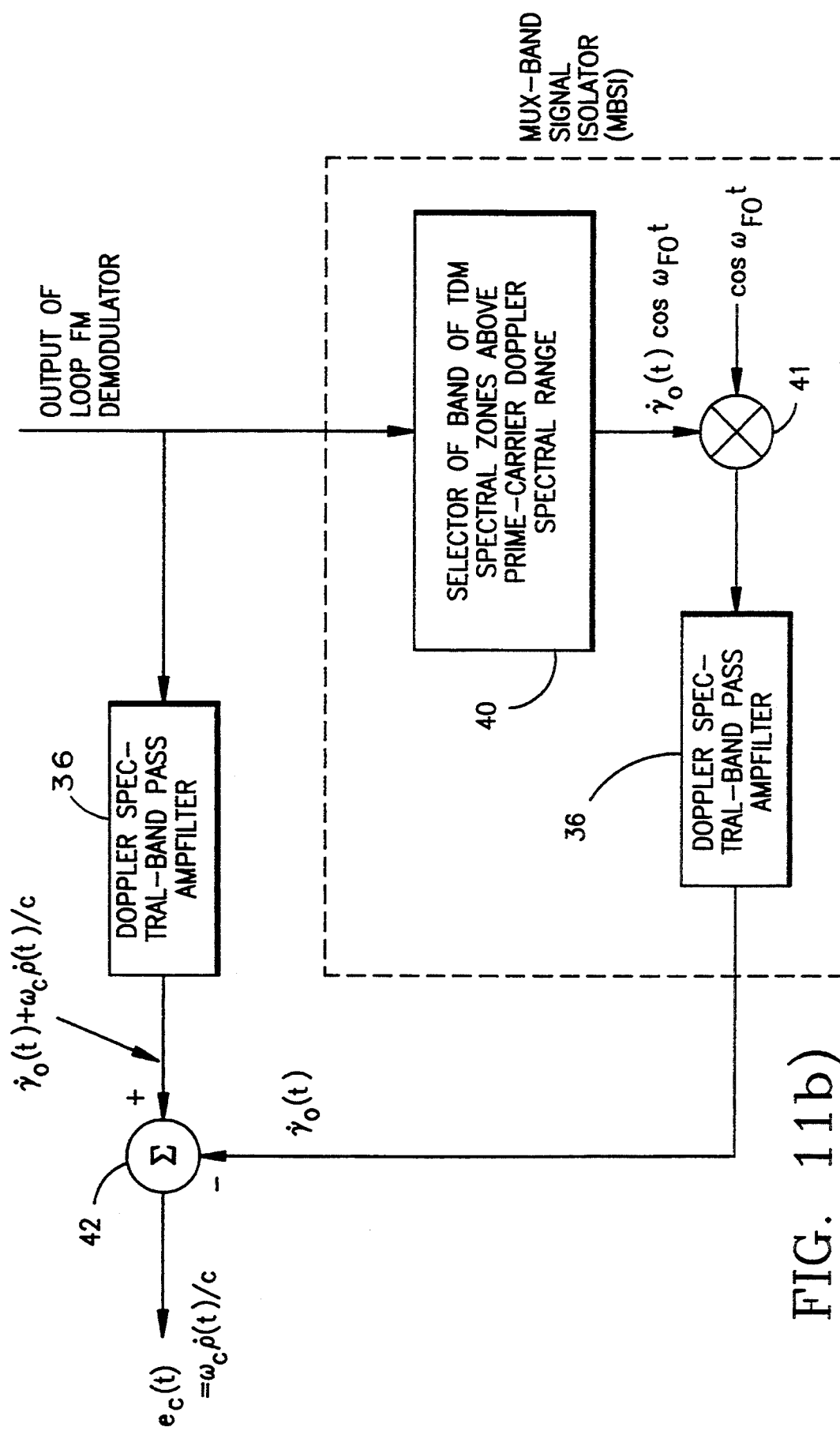

For TDM/FM, the control signal, $e_c(t)$, in FIG. 11a) can be derived as illustrated in FIG. 11b) wherein the MBSI (designed in accordance with the principles and guidelines presented earlier in this disclosure) derives a replica of the source modulation sampling-spectral zones centered at 0 Hz and at the framer repetition frequency and the lower multiples of this frequency, that is free of the prime-carrier Doppler-shift modulation. Said replica is then used to subtract out the corresponding part of the source modulation that overlaps the Doppler-shift spectrum.

Inspection of the block diagram in FIG. 11a) reveals that the accuracy with which the Doppler-shift modulation is imparted to the DOPPLER-CONTROLLED OSCILLATION is determined by the degree of original-modulation suppression by the LOOP DOPPLER ISOLATOR, Block 36.

The block diagram in FIG. 11a) shows that the loop is finally closed by means of a single-sideband (SSB) upconversion process. The reason for this is that, in view of the severe requirement for Doppler measurement accuracy and of the fact that FM-controlled oscillators (with the exception of Armstrong-type frequency-modulated oscillators) are notoriously frequency-unstable, the DOPPLER-CONTROLLED OSCILLATOR should have as low a free-running oscillation frequency as possible, consistent with adequate frequency biasing. The purpose is to ensure the lowest possible absolute frequency drift during the test mission. From the theory of frequency measurement based on time-interval counting, the optimum bias frequency, for equal peak values of positive and negative Doppler shift, is given by $$f_{b,opt} = 3 \times \text{(Maximum Expected Doppler Shift)}$$

For peak values of L- and S-band Doppler shifts of at most a few tens of KHz, the DOPPLER-CONTROLLED OSCILLATOR frequency will be about 100 KHz. It will therefore be necessary to shift the Doppler-controlled oscillation frequency up to several multiples of the bandwidth occupied by the original source-modulated signal applied at point ①, in order to facilitate the LOOP IF AMPFILTERing function. This is done, as illustrated in FIG. 11a) by employing an ULTRA-STABLE OSCILLATOR and a single-sideband (SSB) upconverter, to bring the reference "carrier" frequency up to the value $(\omega_{if} - \omega_{if}')$ rad/s, and thus close the loop.

Up to this point, the DSCE process of extracting a Doppler-shifted carrier component was based on the Doppler component of the composite frequency modulation being separable because: i) Its spectrum is either not overlapped at all by the spectrum of the non-Doppler component of the frequency modulation, or it is overlapped by a very small fraction of the energy in the non-Doppler component; or ii) The overlapping part of the non-Doppler component is reproducible from another part of the spectrum that does not overlap the prime-carrier Doppler spread about 0 Hz. The emphasis in this disclosure will now shift to the elimination of non-Doppler components that are distinguishable from the Doppler component by their time-localized waveform characteristics. The disclosure will be carried out principally in terms of Doppler plus non-Doppler modulations induced by in-situ antenna motion and switching between wildely separated antennas on the LOM or reversing of the sense of the motion along the LOM. However, the methods of the present invention for the elimination of waveform impulses and/or steps apply also to the elimination of impulses and steps introduced by additive random noise or impulse noise under conditions of relative signal and noise powers or energies near and below the so-called FM noise threshold.

The non-Doppler component of the frequency modulation may according to the present invention be eliminated by appropriate utilization of outputs that can be made available directly from antennas in the LOM antenna structure, or by operating on the signal that combines both the Doppler and non-Doppler frequency modulation components. For convenience, the former method is referred to herein as the antenna-based DSCE, and the latter as the signal-based DSCE.

Figure 12A:
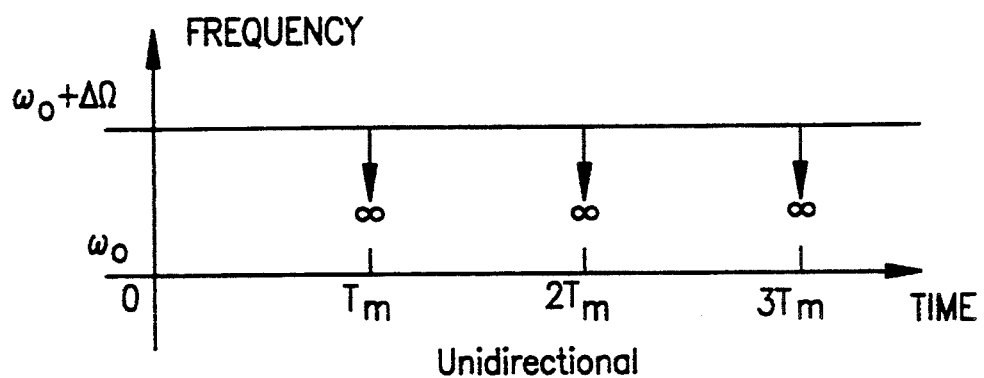
FIG. 12 shows sketches of frequency modulation waveforms that are helpful for disclosing several embodiments of the present invention.

Consider, first, the antenna-based DSCE. The prior-art methods and apparatus of implementing the actual or simulated in situ motion of an antenna along a straight line of finite length (or LOM) introduce non-Doppler, discrete-time modulation in the forms of:

1. Abrupt phase steps, or instantaneous frequency impulses, if the actual or simulated antenna motion (henceforth antenna motion) consists of repetitive unidirectional traversals of the LOM (line of motion) with abrupt (or infinite-speed) flybacks from the end point on the LOM to the starting point, when the path-length difference of the signal wavefront between the ends of the LOM is not an exact integer multiple of a wavelength of said signal wave. (FIG. 12a).)

Figure 12B:
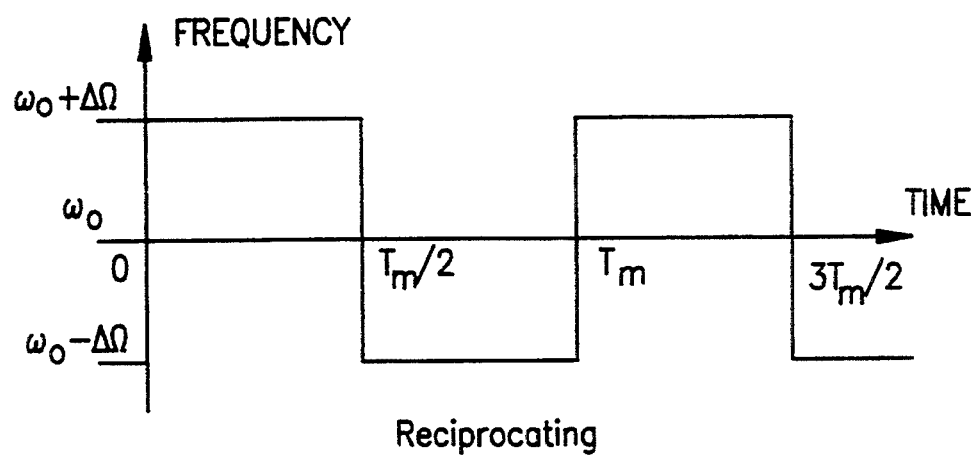

2. Instantaneous frequency pulses opposite in polarity to the shift in frequency induced by the forward traversal of the LOM, if the antenna motion consists of repetitive unidirectional traversals of the LOM with finite, relatively high-speed returns from the end point of the LOM to the starting point, when the path-length difference between the ends of the LOM along the radial path of incidence or departure of a signal wavefront is not an exact integer multiple of a wavelength of said signal wave (FIG. 12b).)

Figure 12C:
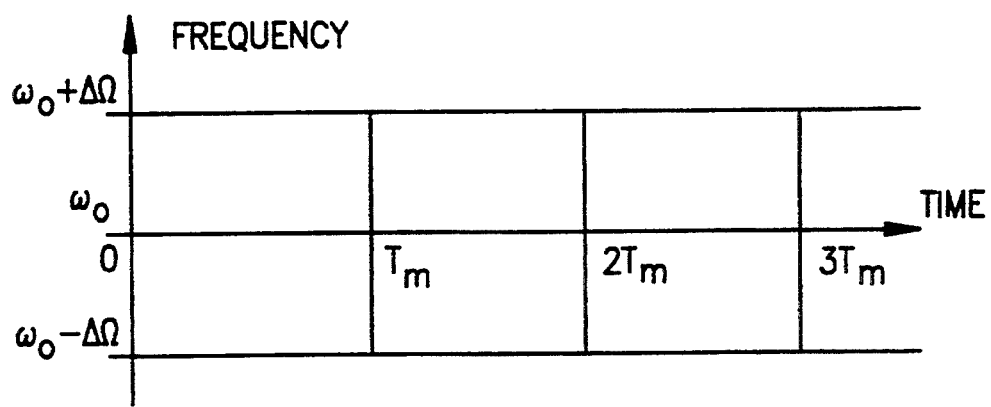

2. Abrupt instantaneous frequency steps, if the antenna motion consists of reciprocating traversals (i.e., traversals that reverse sense at the end points of the LOM), one of said steps occurring each time the antenna motion reverses sense abruptly. (FIG. 12c).)

The above non-Doppler modulations interfere with, impede, degrade the measurement or counting of the Doppler shift. Such modulations cause the signal to be broken up into spectral components that divert the power in the signal away from the induced-Doppler shifted carrier frequency leaving no component at that frequency. The absence of a discrete spectral component at the induced-Doppler shifted carrier frequency makes it difficult to obtain the full potential accuracy of frequency counting over a time interval extending beyond one period of the repetitive traversals of the LOM. The full realization of potential counting accuracy is predicated on the ability to extract a discrete spectral line at the Doppler-shifted carrier frequency within a very narrow bandwidth, and on the ability to count this frequency over an uninterrupted time interval that encompasses many repetitions of the LOM traversals. Moreover the break up of the signal into spresd out frequency components exacerbates frequency-spectral overlaps in a multi-signal environment.

This disclosure describes methods for cancelling out, stripping off or otherwise eliminating the aforementioned non-Doppler modulations.

Consider, first, phase-step modulation. In certain embodiments (FIG. 13) of the present invention, the step modulation is simultaneously and separately derived by antenna switching means, in time coincidence with its occurrence in the LOM output, and is then used to cancel it out of said output of the moving antenna LOM. In certain other embodiments (FIG. 14), the timing of the flyback is controlled so that phase continuity is preserved. In yet certain other embodiments (FIGS. 15, 16 and 17) of the present invention, the output of the moving antenna is first FM-demodulated, the demodulator output is then sampled between the occurrences of successive impulses (each of which corresponds to a phase step), and the sampled values are finally applied to a smoothing or interpolation filter to obtain the Doppler component waveform free of non-Doppler effects.

Reference is now made to FIG. 13. Unidirectional traversal of the LOM with instantaneous flyback from the end of the LOM to its starting point yields, in response to a signal described by $\cos \omega_c t$, $$e_{LOM}(t) = \cos\{2\pi[f_c + (f_m D/\lambda)\cos\phi]t + (\psi_A - \psi_B)u_{-1}(t - k/f_m)\} \tag{34}$$

$f_c = \omega_c/2\pi$, $\psi_A$ and $\psi_B$ are the phases at points A and B on the LOM, D is the LOM length, $\lambda$ is the wavelength of said signal, $\phi$ is the radial angle of the normal to the wavefront of said signal relative to line of motion (LOM), $u_{-1}(t)$ is the unit-step function occurring at $t=0$, $f_m$ is the number of unidirectional traversals of the LOM per second and k is an integer index that tags the instants of flyback. The purposes of the switching structures in FIGS. 13A), b) and c) is to generate a signal $$e_o(t) = \cos\{\omega_c t + (\psi_A - \psi_B)u_{-1}(t - k/f_m)\} \tag{35}$$

which carries only the non-Doppler phase steps in exact time cincidence with those in Eq. (34). The structure in FIG. 13d) is for combining $e_{LOM}(t)$ and $e_o(t)$ to obtain $$e_{IDFS}(t) = \cos\{\omega_b + 2\pi(f_m D/\lambda)\cos\phi\}t \tag{36}$$

In FIG. 13a), at a flyback time instant designated by an odd value of k, corresponding to which Switch 44 is presumed to be in the connection to point B, said Switch 44 is flipped over to point A. At the same time, the Switch 46 already connected to the output of Switch 44, Switch 47 closes to connect to the signal input to Mixer 48. While these connections are held, Switch 45 is switched to point B, and awaits the next flyback instant. Midway in the forward LOM traversal cycle from A to B, the output point for $e_o(t)$ is disconnected at Switch 47, and connected at Switch 46 to the point of Switch 45. Just before the next (even k) flyback instant, Switch 47 is closed again, and then at the instant of flyback, Switch 45 is flipped from point B to point A.

In the alternative embodiment of FIG. 13b), Switch 45 and its candidate connections are omitted, and the outputs from points A and B are taken by switching Switch 44 at the flyback instants back and forth between said points. The output resulting from the jump from B to A is utilized as is. However, the output resulting from the jump from A to B at the next flyback instant has the polarity of its phase step first reversed by the mixing process in Block 49 and its associated BANDPASS AMPFILTER 50.

Figure 13C:
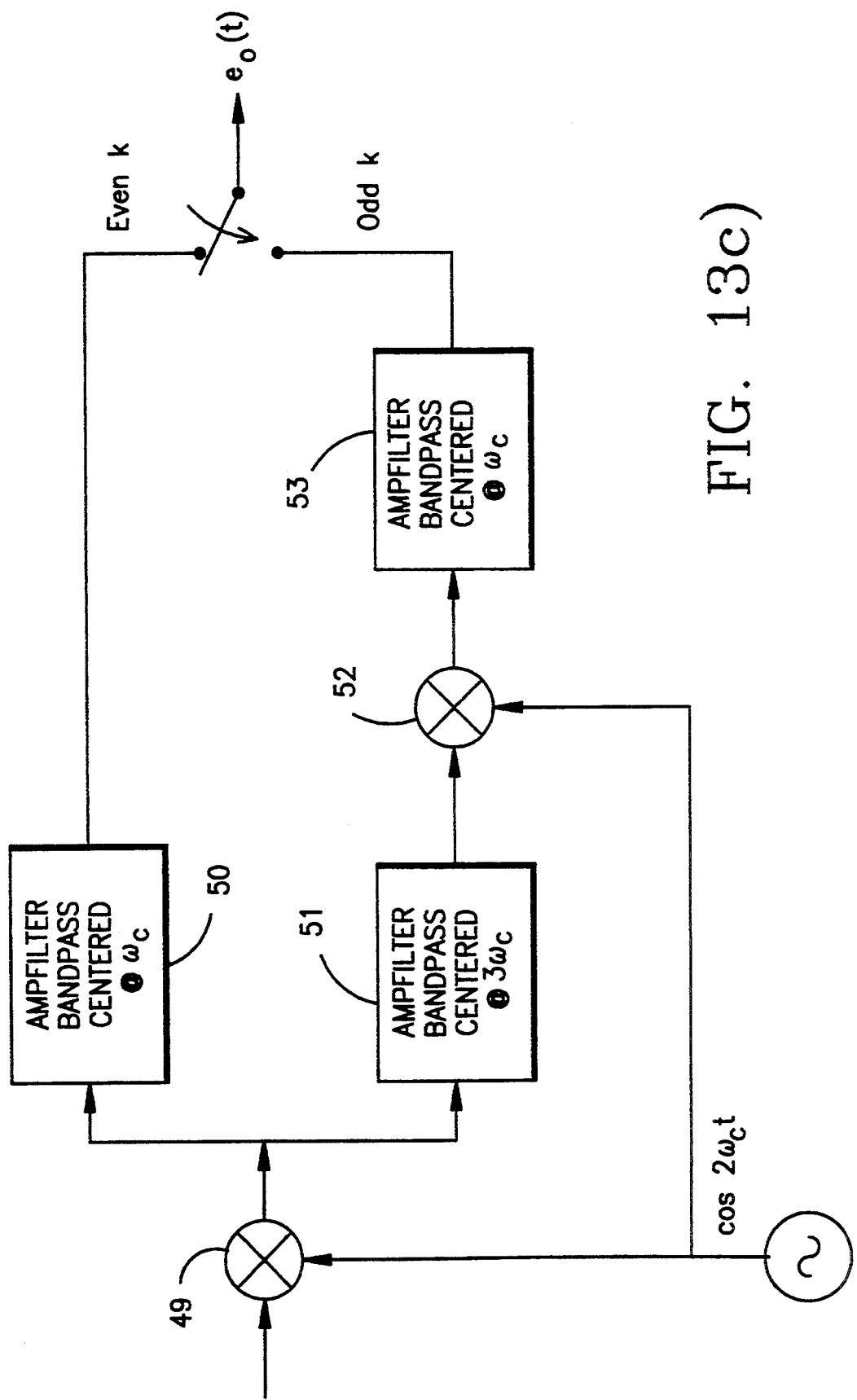
FIG. 13 illustrates embodiments of the present invention utilizing switches to cancel out unwanted phase steps that may result from abrupt jumps in the position of an antenna between ends of a line of motion (LOM).

In the other alternative embodiment of FIG. 13c), the sum as well as the difference frequency zones in the output of Mixer 49 are utilized to obtain the phase step from point B to point A in the output of BANDPASS AMPFILTER 50 at even-k flyback instants, and in the output of BANDPASS AMPFILTER 53 at odd-k flyback instants.

Figure 13D:
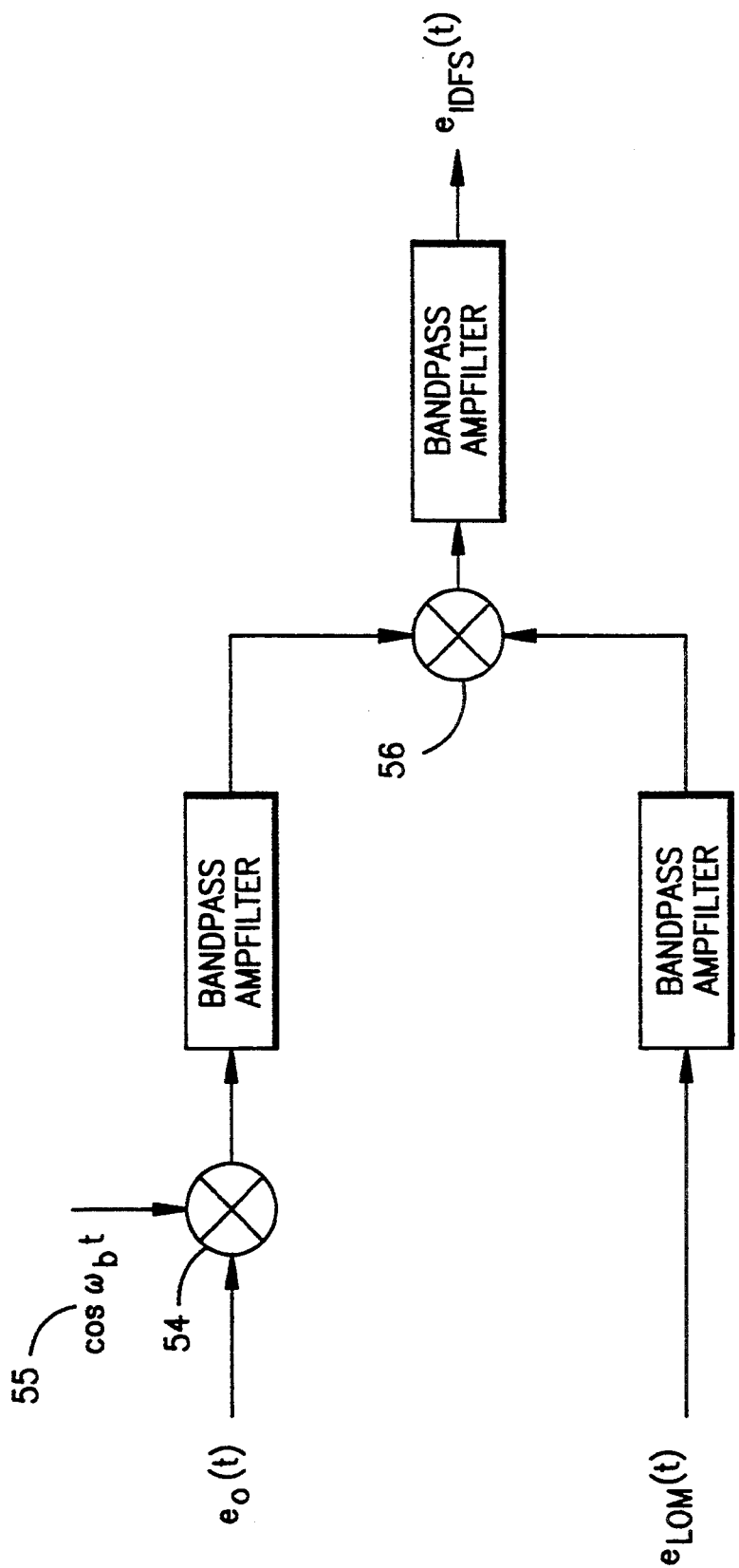

In the block diagram in FIG. 13d), $e_o(t)$ of Eq. (35) is mixed in 54 with a frequency-bias oscillator signal 55, and the result is mixed with 56 with $e_{LOM}(t)$ of Eq. (34) to obtain $e_{IDFS}(t)$ of Eq. (36).

Figure 14A:
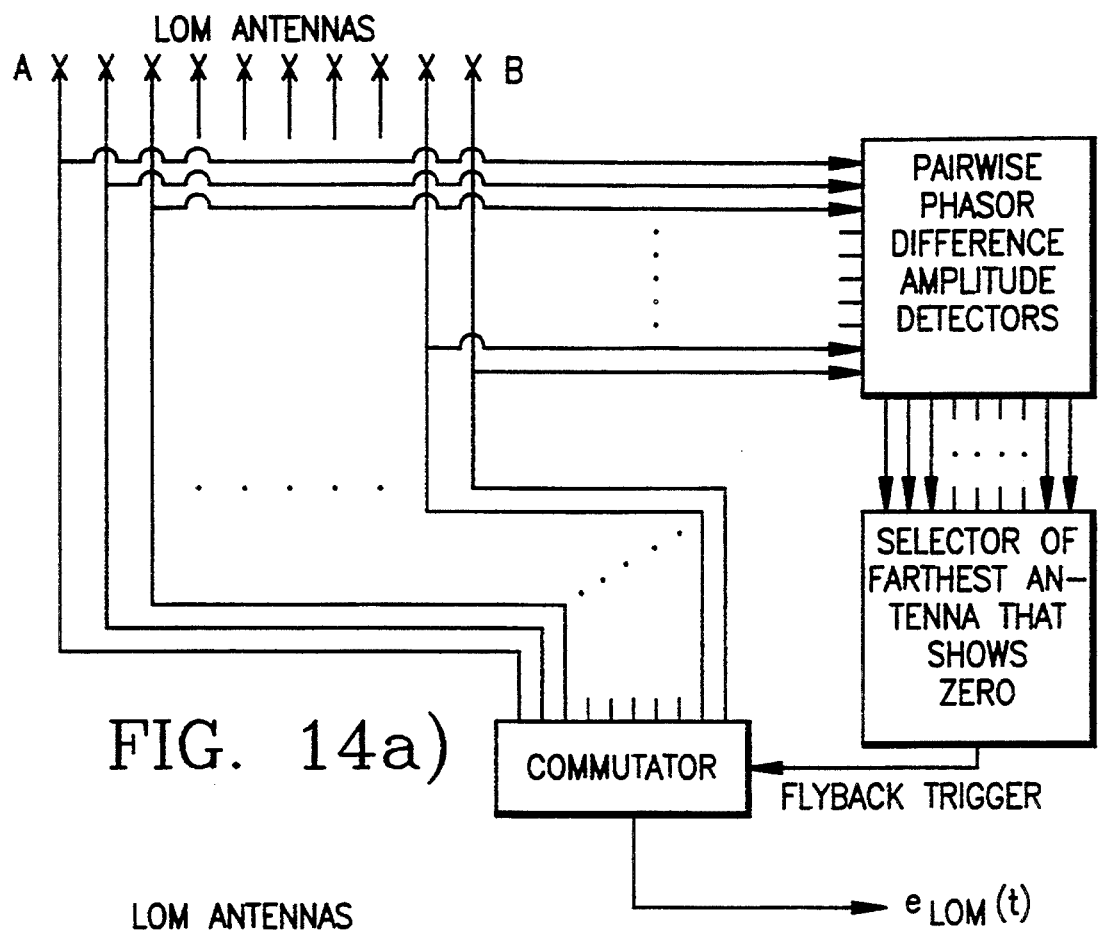
FIG. 14 illustrates methods for averting phase steps by abruptly hopping an antenna position between points between which the signal phases differ by an integer multiple of $2\pi$ radians.
Figure 14B:
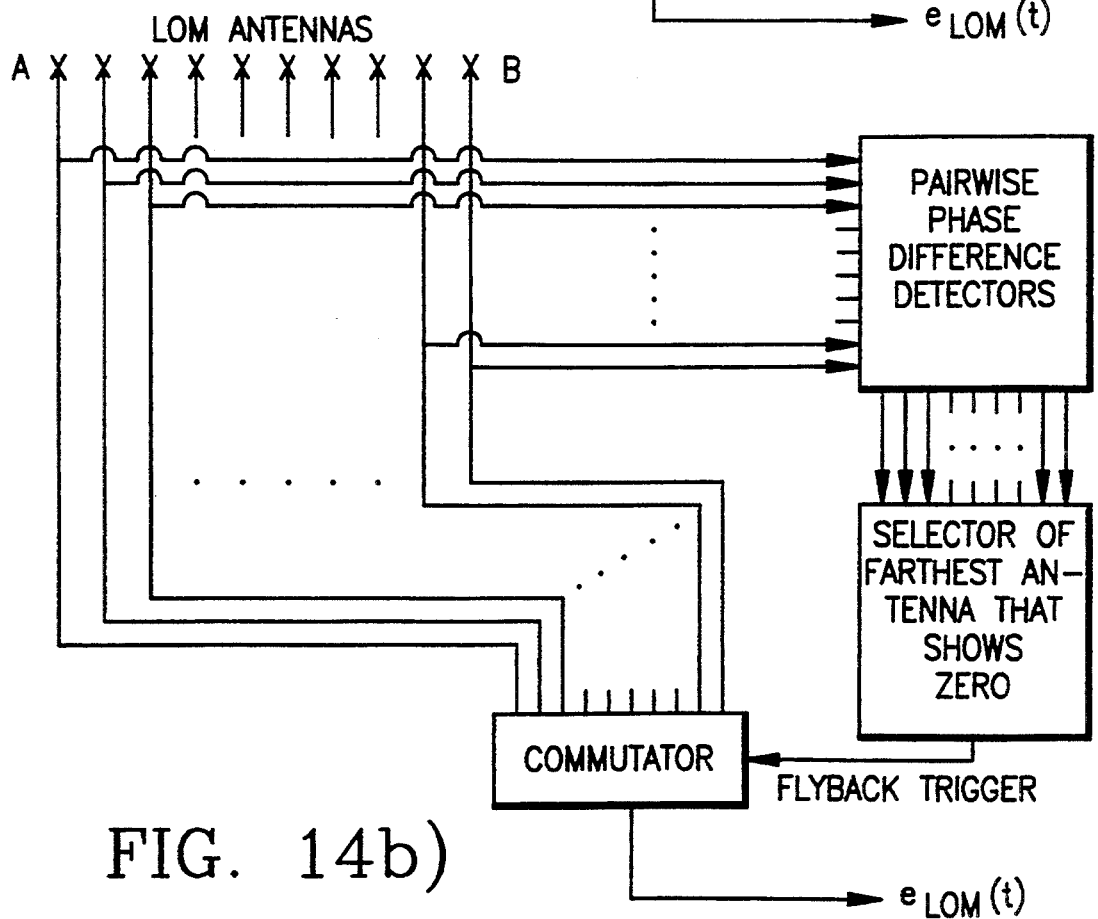

Reference is now made to FIG. 14. The non-Doppler phase steps are averted in this embodiment of the present invention by performing the flybacks between antenna poasitions at which the signal outputs differ in phase by very nearly, if not exactly, an integer multiple of $2\pi$ radians. In FIG. 14a), the latter condition is determined by taking the phasor difference between pairs of antenna outputs, in which case satisfaction of said condition is indicated by the difference whose amplitude is practically zero for an antenna with the maximum spacing within the length of the LOM. In FIG. 14b), phase-difference detectors are employed to determine the pair of antenna outputs that satisfy said condition. Instantaneous flyback from the last antenna to the first on the LOM is achieved by connecting the two permanently. Instantaneous flyback from the n-th antenna down the LOM to the first can be effected by connecting them by a switch controlled by the amplitude of a phasor-differencer output in FIG. 14a), and by the output of a phase-difference detector in FIG. 14b).

Figure 15:
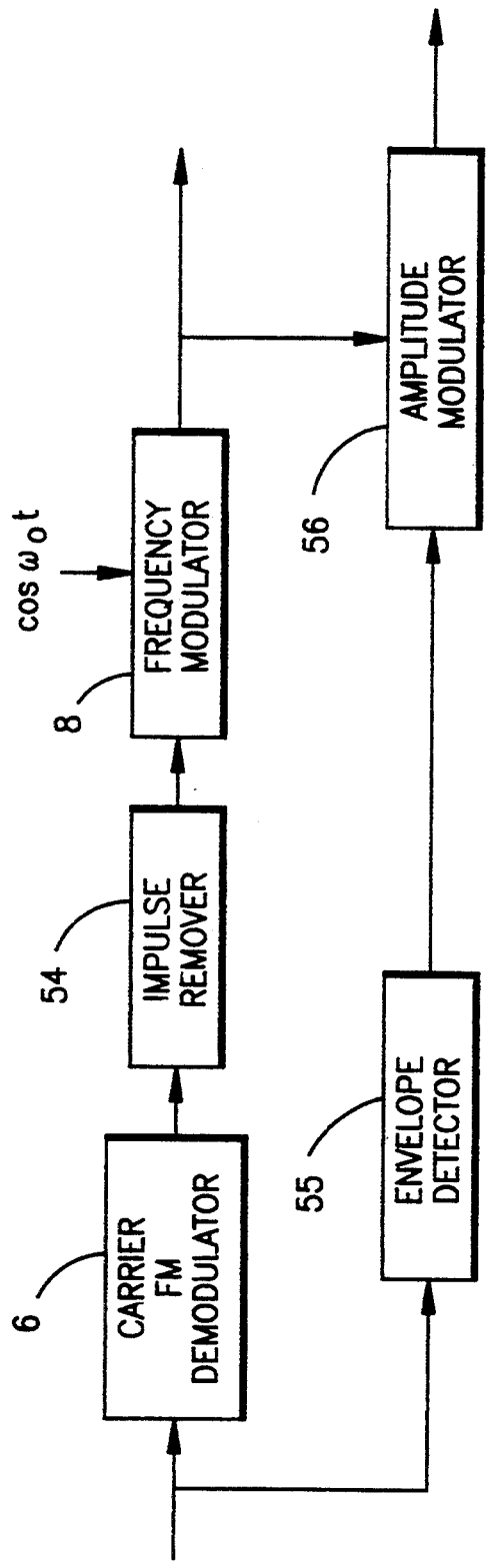
FIG. 15 illustrates an embodiment of the present invention for eliminating unwanted phase steps carried by a complex-modulated signal.
Figure 16:
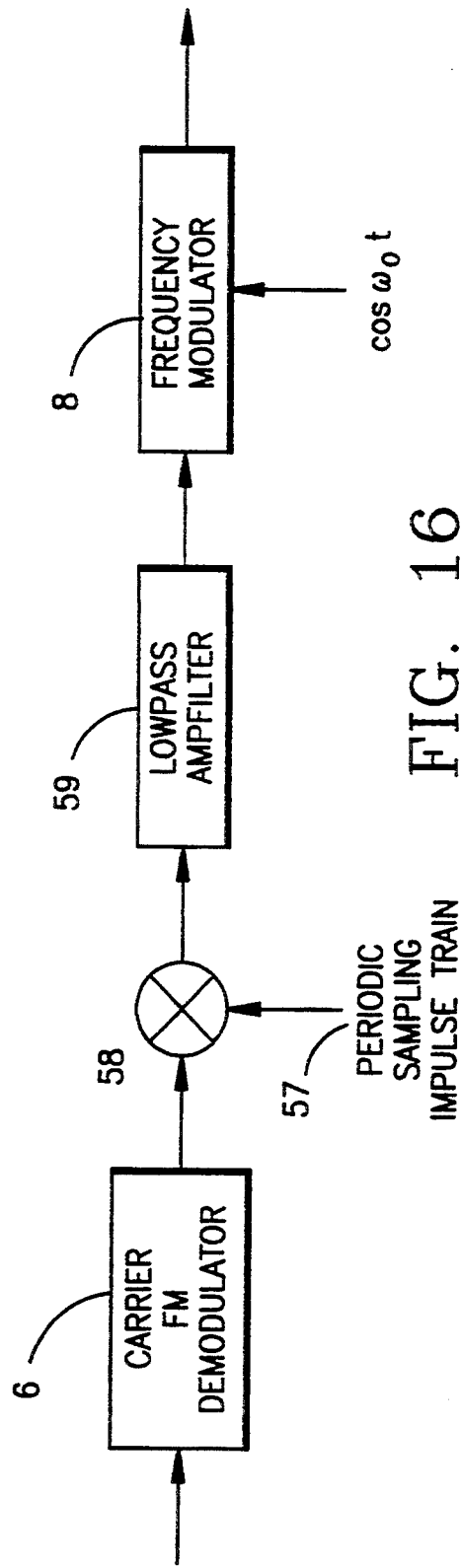
FIG. 16 illustrates yet another embodiment of the present invention for eliminating phase steps carried by a signal by means of a process of sampling between occurrences of corresponding frequency impulses.
Figure 17A:
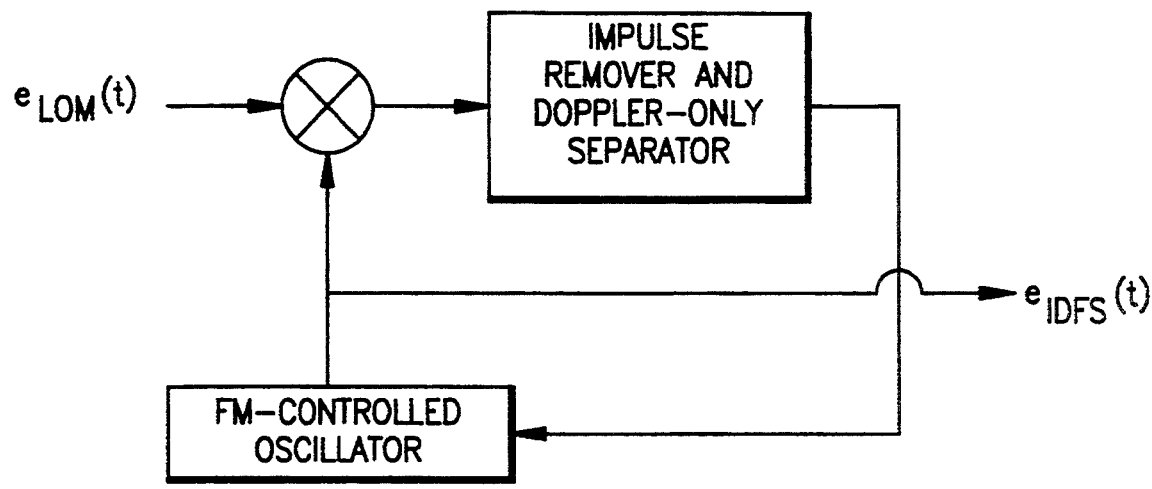
FIG. 17 illustrates embodiments of the present invention utilizing impulse elimination within FFAPC and AFFC loops to cleanse a signal of unwanted phase steps.
Figure 17B:
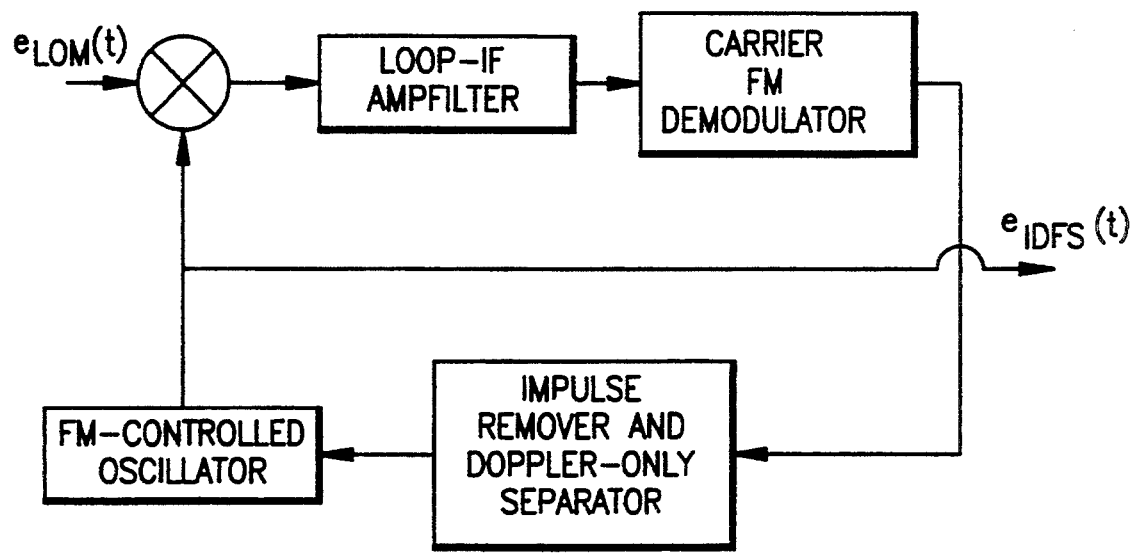

Reference is now made to the embodiment of the present invention illustrated in FIG. 15. The CARRIER FM DEMODULATOR 6, operating on a signal described in Eq. (34), yields an output in which the effect of the non-Doppler phase steps is manifested in the presence of impulses spaced in time by $1/f_m$sec. IMPULSE REMOVER 54 eliminates said impulses by impulse-excision means, or by by-passing them altogether through a process of sampling in-between the occurrences of impulses, followed by a process of interpolation to reconstruct the Doppler waveform without the non-Doppler impulses. Said Doppler waveform is then applied to a FREQUENCY REMODULATOR 6 to reconstruct the FM signal without the phase steps. The embodiment employing sampling followed by interpolation and FM remodulation is illustrated in FIG. 16. With reference to FIG. 16, the process of sampling is symbolically represented by multiplying the output of the CARRIER FM DEMODULATOR 6 by PERIODIC SAMPLING IMPULSE TRAIN 57 in multiplier Block 58. The interpolation is performed in said embodiment by LOWPASS FILTER 59. The more general configuration shown in FIG. 15 applies to the reconstruction of a general complex-modulated signal free of an undesired phase step modulation component. The embodiments shown in FIG. 17 regenerate an FM signal free of undesired phase steps, by employing frequency-following automatic phase control (FFAPC) in FIG. 17a), and automatic frequency following (AFF) control in FIG. 17b).

Consider, next, non-Doppler frequency-step modulation super-imposed on a non-stepped frequency modulation, such as IDFM and IDFS. In certain embodiments (FIGS. 18, 19 and 20) of the present invention, the frequency-step modulation is simultaneously reproduced by mirror-image antenna motions to derive a second replica of the LOM signal carrying the frequency steps in polarities opposite to those of the first, and the resulting two replicas are then combined to cancel said frequency-step modulation component out. In certain other embodiments (FIGS. 21, 22) of the present invention, the second LOM-signal replica with mirror-image opposite step polarities is obtained by operating in the receiver on first said LOM signal, and the two replicas are then combined by alternate switching into a selector, said switching being controlled so that frequency continuity is preserved in said selector output. In yet certain other embodiments (FIGS. 23, 24 and 25) of the present invention, the LOM output signal is first either beat down to zero-Hz center frequency by multiplying two mirror-image frequency-step-modulated replicas of said output, or is FM-demodulated. If first beat down to 0 Hz, the result is then single-sideband upconverted to yield an FM signal without the frequency steps. However, if first FM demodulated, the demodulator output is then operated on to excise the steps, or to bypass them. The bypassing of the steps is effected by sampling the demodulator output in-between the occurrences of the steps and applying the samples to an interpolator. The resulting interpolated baseband waveform is then applied to regenerate an FM signal in which the retained frequency modulation is of continuous (nonstepped) waveform.

Figure 18:
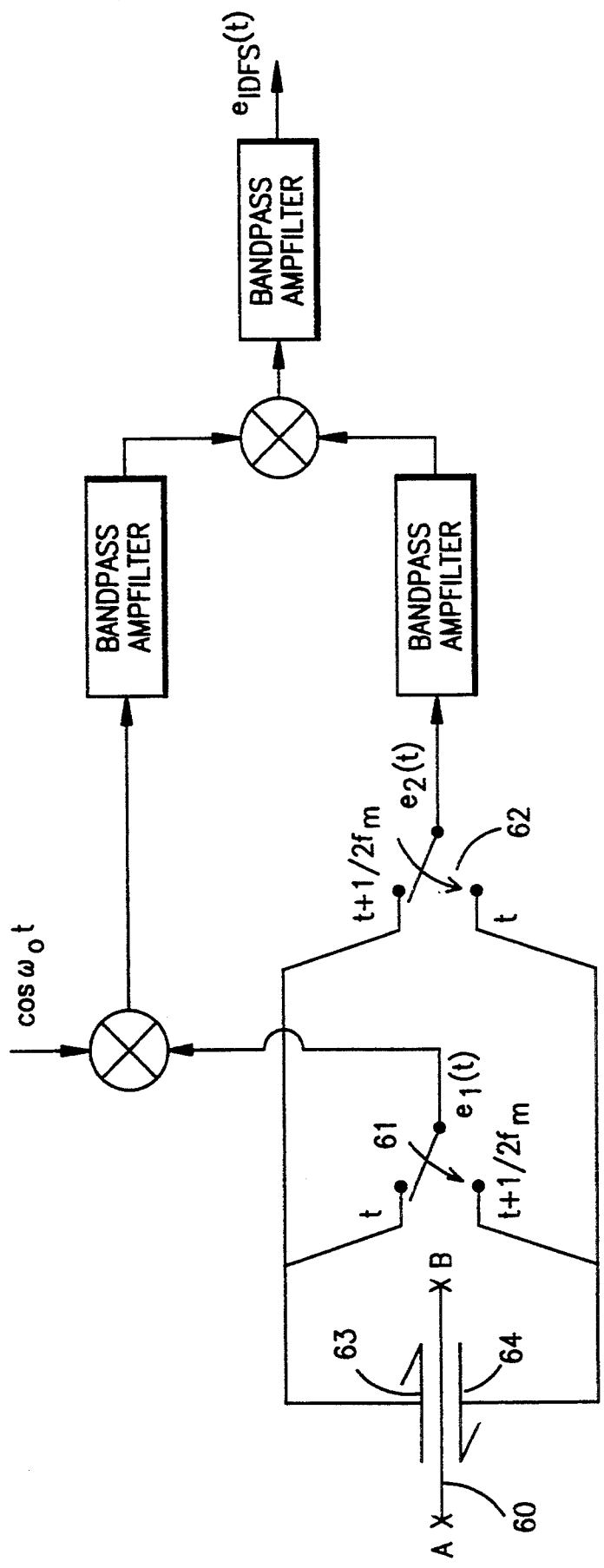
FIG. 18 illustrates a method of switching between half-periods of simultaneous-bidirectional traversals of a single line of motion (LOM) to avert unwanted frequency steps due to abrupt motion-sense reversals at the ends of the LOM.

Reference is next made to FIG. 18. In this embodiment, a single LOM, 60, is employed with simultaneous-bidirectional traversals of it. The "t" tags shown on the throw positions of Switches 61 and 62 signify connection when the upper Commutator 63 is sweeping from A toward B and the lower Commutator 64 is sweeping from B toward A. The tag "$t+\tfrac{1}{2}f_m$" signifies connection when Commutator 63 is sweeping from B toward A, and Commutator 64 from A toward B. The resulting outputs from the pole sides of said switches are (assuming a common starting point at the mid-point of the LOM)

$$e_1(t)=\cos(\omega_c+\Delta\Omega)t$$

and $$e_2(t)=\cos(\omega_c-\Delta\Omega)t$$

where $\Delta\Omega/2\pi=2f_m(D/\lambda)\cos\phi$. If these two outputs are combined as indicated in FIG. 18, then $$e_{out}(t)=\cos(\omega_o+2\Delta\Omega)t$$

Reference is now made to FIG. 19. In this embodiment, two parallel LOM's are employed, 65 and 66, each being alternating-bidirectionally traversed, with abrupt sense reversals at each end point. For uniform velocity of traversal in each direction, constant $\phi$ and $\Delta\Omega$ again denoting the one-way IDFS, $$e_1(t)=\cos\{\omega_c+\Delta\Omega e_{rect}(t)\}t$$

and $$e_2(t)=\cos\{\omega_c-\Delta\Omega e_{rect}(t)\}t$$

where $e_{rect}(t)$ denotes the alternating polarity ($+$ or $-$) unit-amplitude rectangular waveform, with dwell-time of ($\tfrac{1}{2}f_m$)sec at each polarity. Switch 67 gates a center-frequency change of $\omega_o$ rad/sec, via Mixer Block 68 or 69, whichever it connects to $\cos\omega_o t$. Let $$p(t) = 1, |t| \leq 1/4f_m$$
$$= 0, \text{otherwise}$$

express the gating time function describing the effect of Switch 67. Accordingly, the output of BANDPASS AMPFILTER 70 can then be expressed $$e_{70}(t) = \cos\{\psi_c + \psi_a p(t) + \Delta\Omega e_{rect}(t)\}t$$
$$e_{71}(t) = \cos\{\psi_c + \psi_a p(t - 1/2f_m) - \Delta\Omega e_{rect}(t - 1/2f_m)\}t$$
$$= \cos\{\psi_c + \psi_a p(t - 1/2f_m) - \Delta\Omega e_{rect}(t)\}t$$

Mixing these two outputs in Mixer 72 yields in the output of BANDPASS AMPFILTER 73

$$\begin{aligned} e_{out}(t) &= \cos\{\psi_o[p(t) - p(t - 1/2f_m)] + 2\Delta\Omega e_{rect}(t)\}t \\ &= \cos\{(\psi_o + 2\Delta\Omega)e_{rect}(t)\}t \\ &= \cos(\psi_o + 2\Delta\Omega)t \end{aligned}$$

where we have made use of the fact that $e_{rect}(t)=p(t)-p(t-\frac{1}{2}f_m)$, for $-\frac{1}{4}f_m \leq t \leq \frac{3}{4}f_m$, modulo $1/f_m$.

Figure 20A:
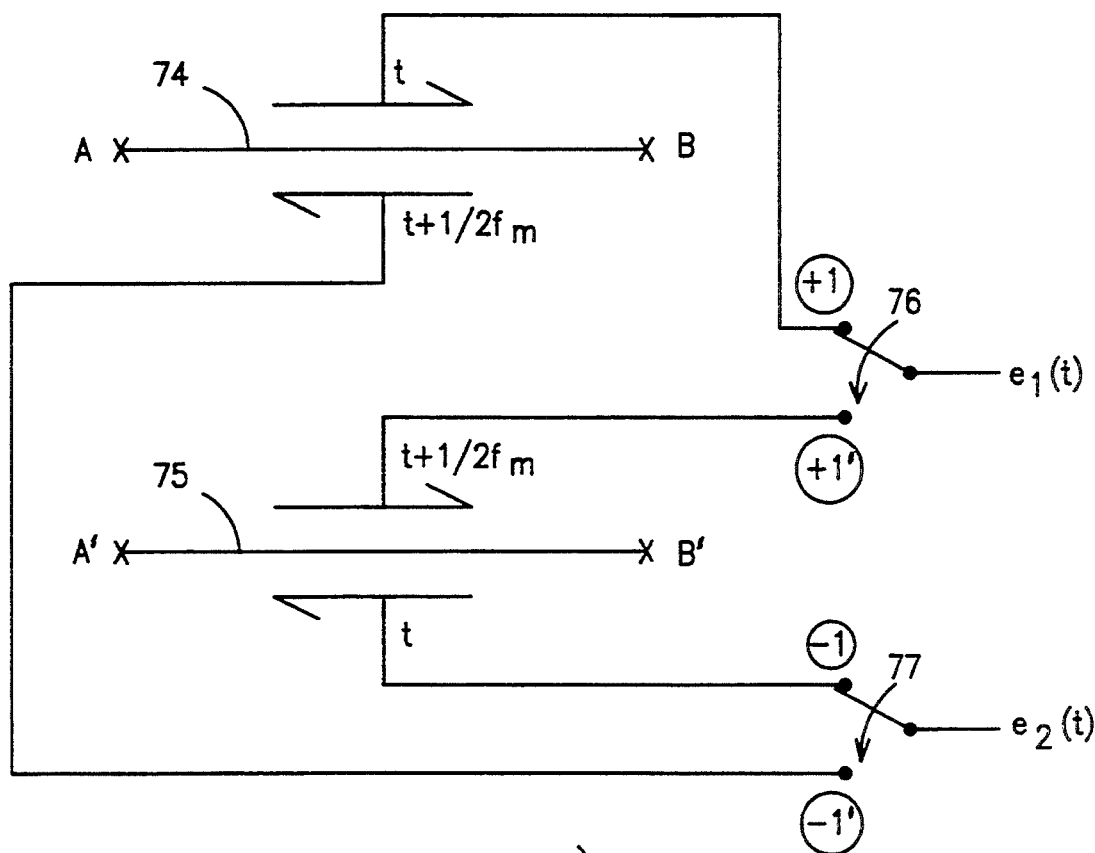
FIG. 20 illustrates yet another method of switching between alternating-bidirectionally traversed LOM outputs to avert unwanted frequency steps.
Figure 20B:
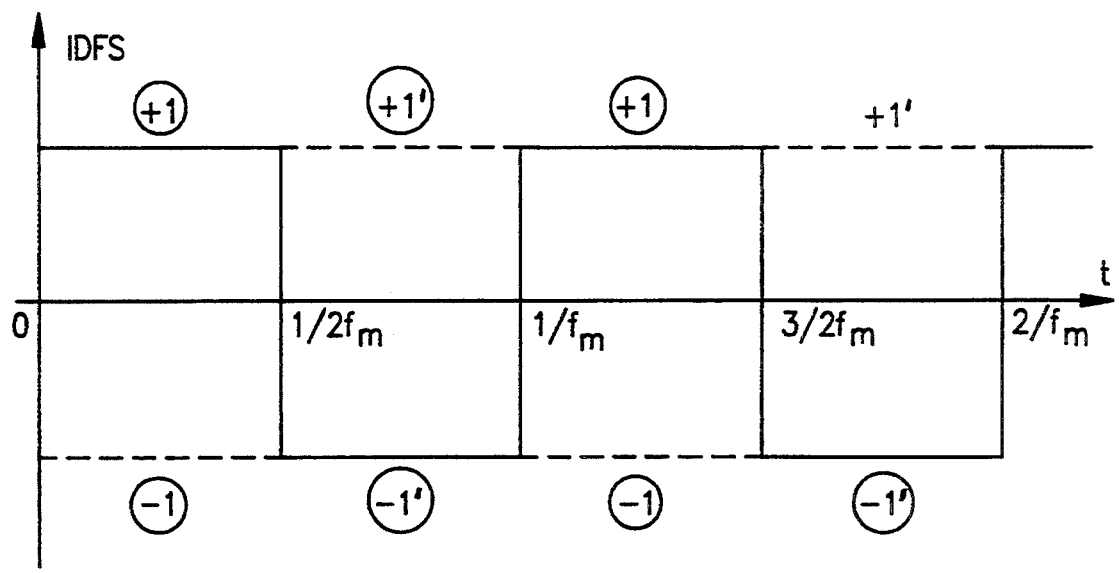

Reference is next made to FIG. 20. In this embodiment, two parallel LOM's are employed, 74 and 75, each being alternating-bidirectionally traversed. Switches 76 and 77 are each operated so that $e_1(t)$ is the output of successive A to B and A' to B' traversals, and $e_2(t)$ is the output of successive B to A and B' to A' traversals.

Figure 21A:
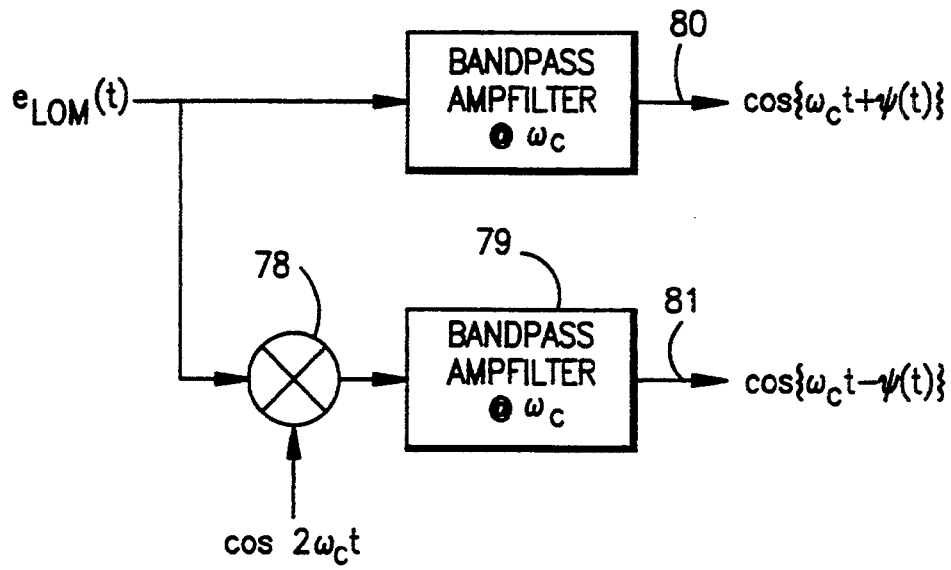
FIG. 21 illustrates embodiments of this invention wherein a signal from an alternating-bidirectionally traversed LOM is operated on to derive a replica of it in which the alternating frequency-step modulation is out of phase with the original.
Figure 21B:
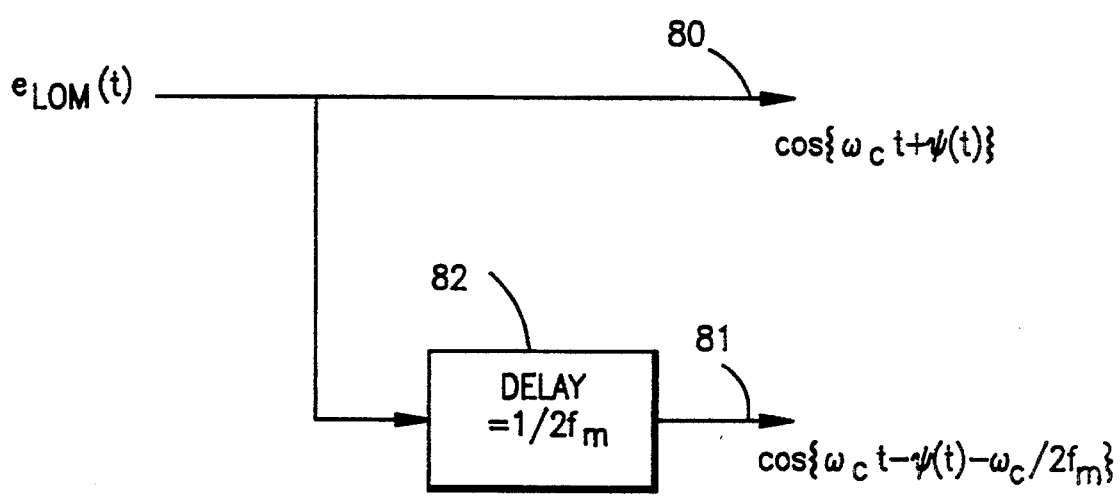

Reference is next made to FIG. 21. In the embodiment of FIG. 21a), the output of an alternating-bidirectionally traversed LOM is operated on in Mixer 78 to delivery out of BANDPASS AMPFILTER 79 a replica 81 of the LOM signal carrying the frequency steps in polarities opposite to those of said output of the LOM. In the embodiment of FIG. 21b), said replica is derived by passing said output of the LOM through a DELAY Block 82, wherein a delay of one LOM traversal time, $\frac{1}{2}f_m$sec, is introduced, which changes all polarities to the reverses of those of said LOM output alternating-step modulation.

Reference is next made to FIG. 22. In the embodiment of FIG. 22a), a SIGNAL SELECTOR 83 is switched between said LOM signal replicas 80 and 81 so that it follows the IDFS in only one of its polarities and delivers an output signal in which said IDFS is maintained continuously in the same polarity. In the embodiment of FIG. 22b), a center-frequency change, denoted $\omega_o$ rad/sec, is introduced during each traversal time interval between instants of IDFS frequency-shift sense reversals, by means of Mixer Block 84 and BANDPASS AMPFILTER 85, into the one of said replicas 80 and 81 for which the IDFS has a prespecified polarity. The frequency-changed and unchanged signal replicas are then mixed in Mixer Block 86 to obtain out of Block 87 an output in which said frequency-step modulation is cancelled out and said IDFS is retained continuously in a non-alternating polarity.

Figure 23:
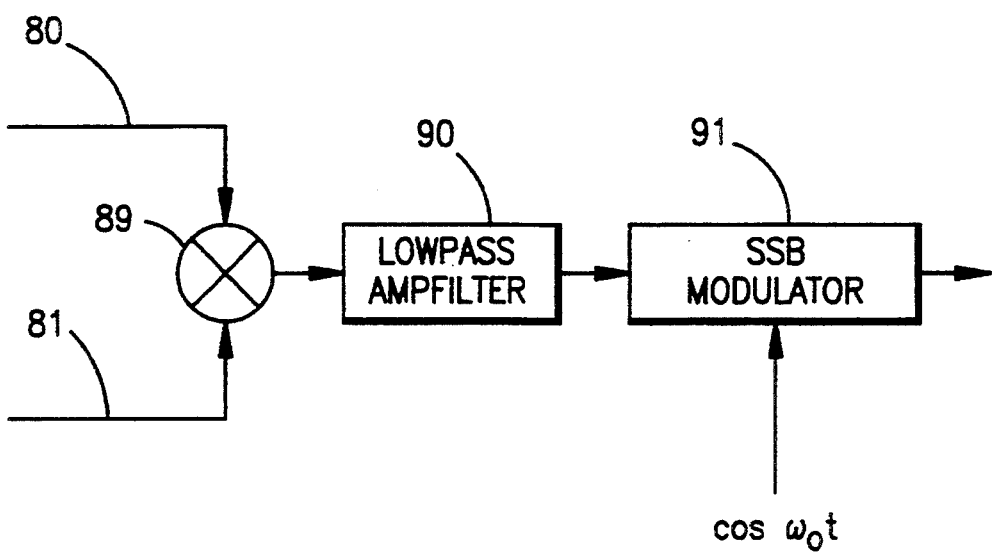
FIG. 23 illustrates a nonswitching embodiment, alternative to those of FIG. 22, utilizing spectral translation methods to eliminate unwanted alternating frequency-step modulation.

Reference is next made to FIG. 23. In this embodiment, the two replicas 80 and 81 of said LOM output signal are multiplied together in Block 89. The resulting 0-Hz spectral zone is then selected by LOWPASS AMPFILTER 90 and single-sideband upconverted to a center frequency $\omega_o$ rad/sec by SINGLE-SIDEBAND MODULATOR 91.

Figure 24:
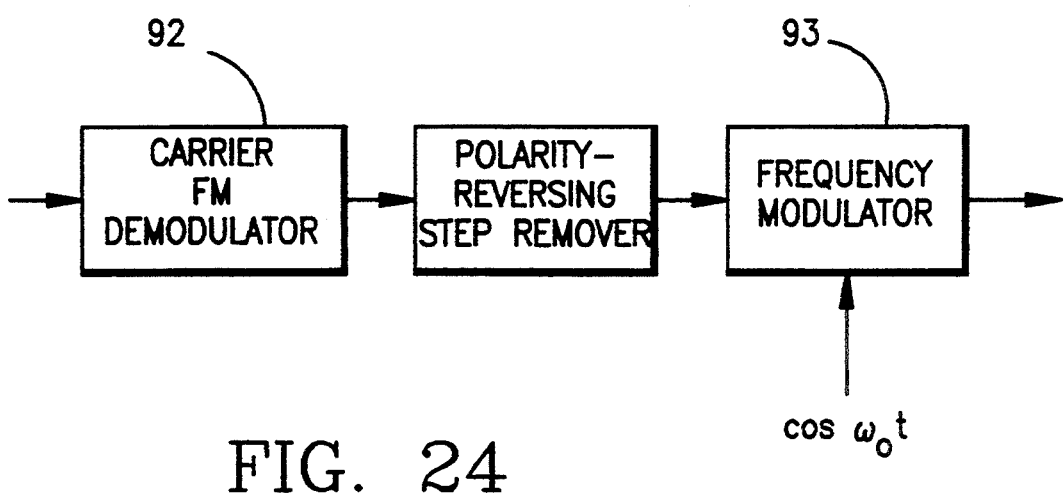
FIG. 24 illustrates a nonswitching embodiment, alternative to those of FIG. 22, utilizing waveform rectification methods in the output of an FM demodulator.
Figure 25A:
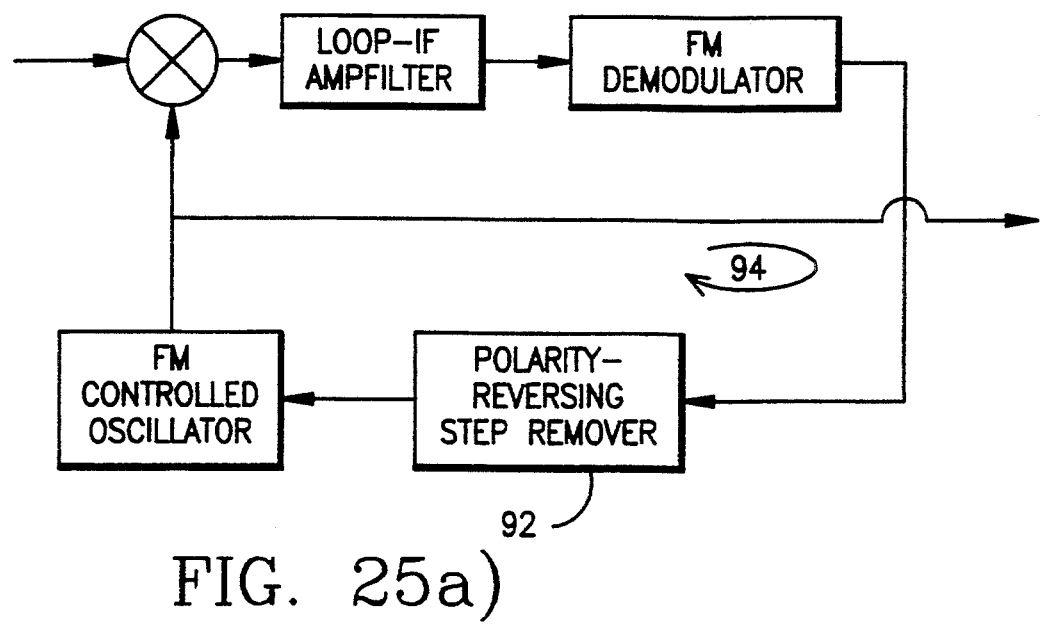
FIG. 25 illustrates embodiments for rectifying alternating frequency-step modulation by means of selective feedback, as well as combined forward and feedback control of a controllable-frequency oscillator.
Figure 25B:
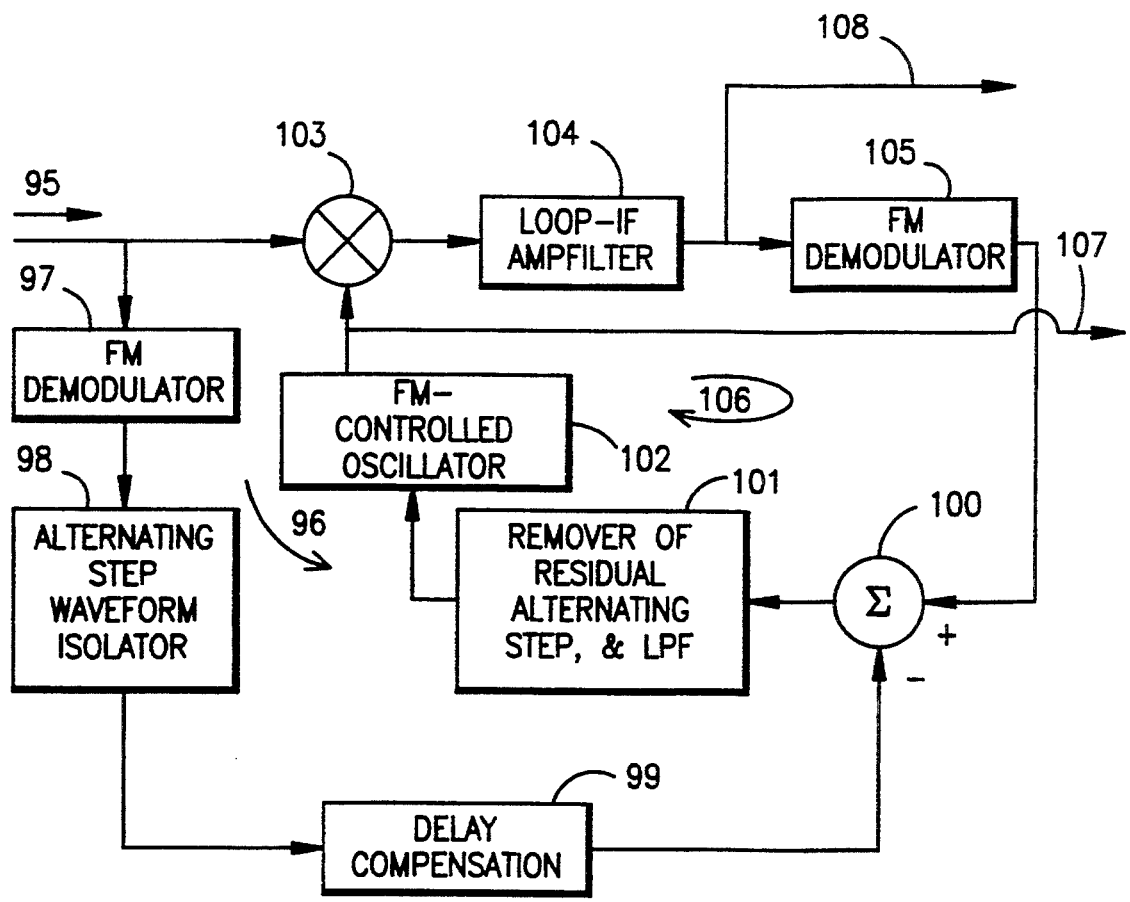

Reference is next made to FIGS. 24 and 25. In the embodiment in FIG. 24, said LOM output signal is applied to an FM demodulator,92. The output of the FM demodulator is then rid of the polarity-reversing step modulation either by sampling and interpolation or by rectification. The FM remodulation process is effected by means of an ordinary FM MODULATOR, Block 93, or in a frequency-following control loop, as illustrated in the embodiment in FIG. 25. In said sampling, the samples are taken at a rate of $f_m$ samples/sec, or some acceptable subharmonic of it, or some other rate, and are timed to fall within intervals of LOM traversals of the same sense. In the embodiment of FIG. 25a), said control loop is a form of AFFC loop, 94. A forward control branch may also be employed either a) to shift the free-running oscillator frequency by the amount of the frequency step, which would aid the loop in acquiring and maintaining the lock to the input signal within a much narrower closed-loop bandwidth; or b) to subtract the stepping component of detected FM so that the oscillation frequency is slaved by the feedback control to follow only the continuous component of the frequency modulation. In the embodiment of FIG. 25b), a forward control branch 96 is added to cancel out the polarity-reversing steps within AFFC loop 105 by means of subtractor Block 100. Alternatively, the polarity-reversing steps in the output of 98 may be delayed one-half of a period in 98 and added in an adder Block 100 to the output of LOOP CARRIER FM DEMODULATOR 105 to cancel out said steps. With either, step cancellation is effected at baseband, and the CONTROLLABLE-FREQUENCY OSCILLATOR (CFO) 102 output 107 is the desired output for frequency counting. If, however, the alternating-step waveform derived in forward path 96 is added in exact time coincidence with the alternating-step frequency modulation of input 95, then CFO 102 output will frequency hop and cancel out the frequency hops of 95 in the output 108 of LOOP IF AMPFILTER 104. In this latter case, the desired continuous-modulation component will appear uncompressed in 108 if this component is first suppressed in Block 101.

Figure 25C:
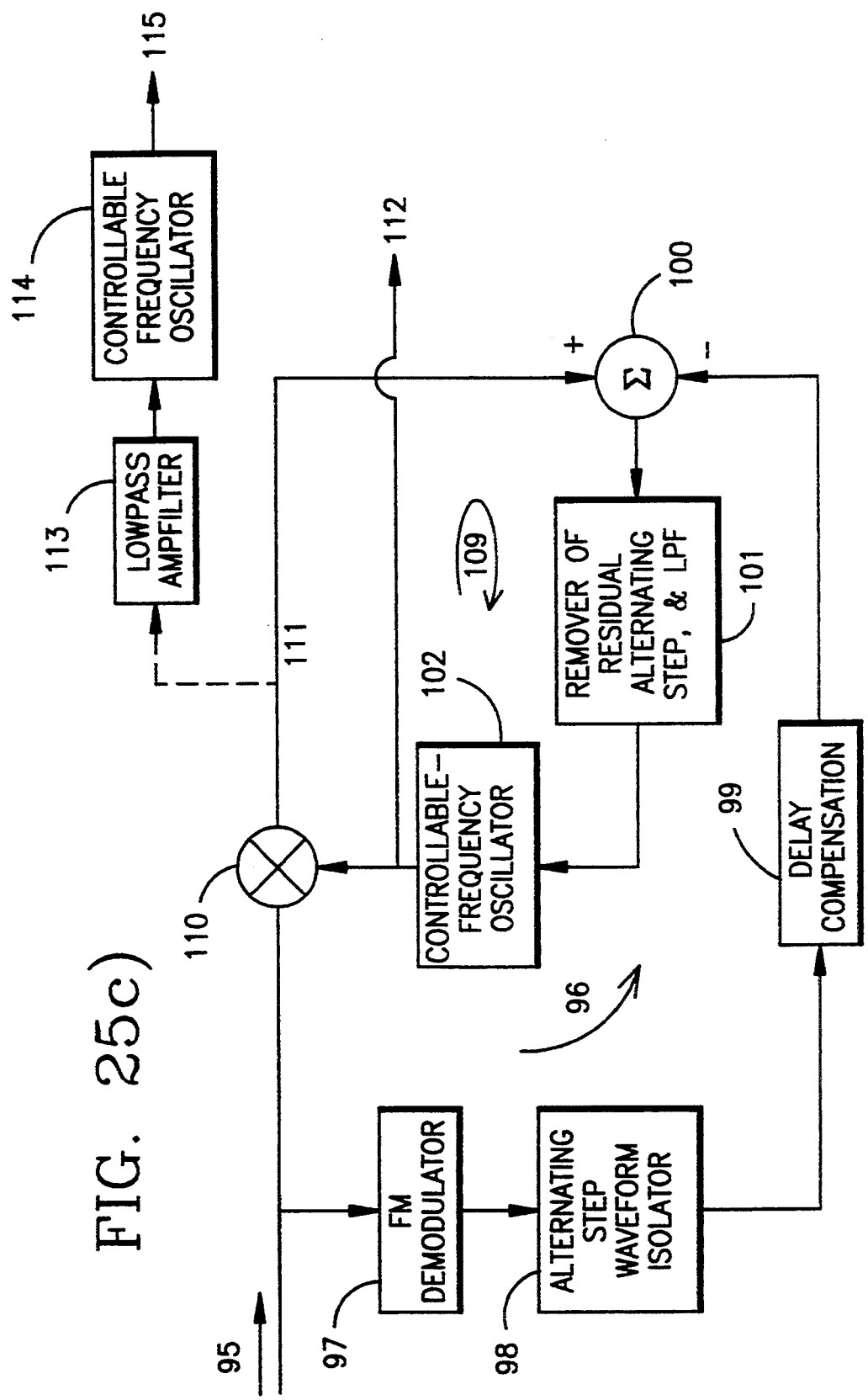

In FIG. 25c), a variation on a frequency-following automatic phase control (FFAPC) loop is employed wherein both forward control, 96, and feedback control, 109, are applied. Again, the alternating-step waveform is extracted in the forward branch to cancel out its counterpart out of the output of "phase detector" 110, in which case the CFO output 112 is the desired output. Alternatively, addition, in Block 100, of the alternating-step waveform derived in forward Branch 96 aids the APC loop acquisition and frequency-following of the signal by shifting the "free-running" frequency of the CFO 102 to very near the IDFS (or impulse-free and step-free component of the frequency modulation) of said signal input 95. The output 111 of phase detector 110 is then lowpass-filtered in Block 113 and then applied to CFO 114 to delivery 115 as the desired output.

The results of unwanted phase-step and frequency-step determinations according to this invention can also be applied to the accurate determination of the wanted continuous component of frequency modulation by digital processing or computational methods. As in the various embodiments of this invention disclosed above, the phase steps and/or the frequency steps are simply cancelled out or corrected for in the A/D conversion of the waveform samples used in the computation of instantaneous frequency. A priori knowledge of the precise instants of occurrence of said discontinuities, plus the results of their accurate measurement according to this invention, can also be applied to significantly reduce the computational load at and around those instants of time.

Digital processing or computational methods for evaluating the desired impulse-free and step-free continuous component of frequency modulation or shift can be categorized into time-domain and "instantaneous-frequency-domain" methods.

The particular time-domain methods of special interest in this disclosure are based on the following expressions for a signal wave as characterized by Eq. (1) (with $\omega_c$ now replaced by $\omega_b$):

a)
$$e(t) = I(t)\cos \omega_b t - Q(t)\sin \omega_b t$$

where $$I(t) = A_c \cos \psi(t) \text{ and } Q(t) = A_c \sin \psi(t) \quad (37)$$

Accordingly, $$\psi(t) = -\tan^{-1} Q(t)/I(t) \quad (38)$$

and $$\dot{\psi}(t) = \{\dot{Q}(t)I(t) - Q(t)\dot{I}(t)\}/\{I^2(t) + Q^2(t)\} \quad (39)$$

Figure 26:
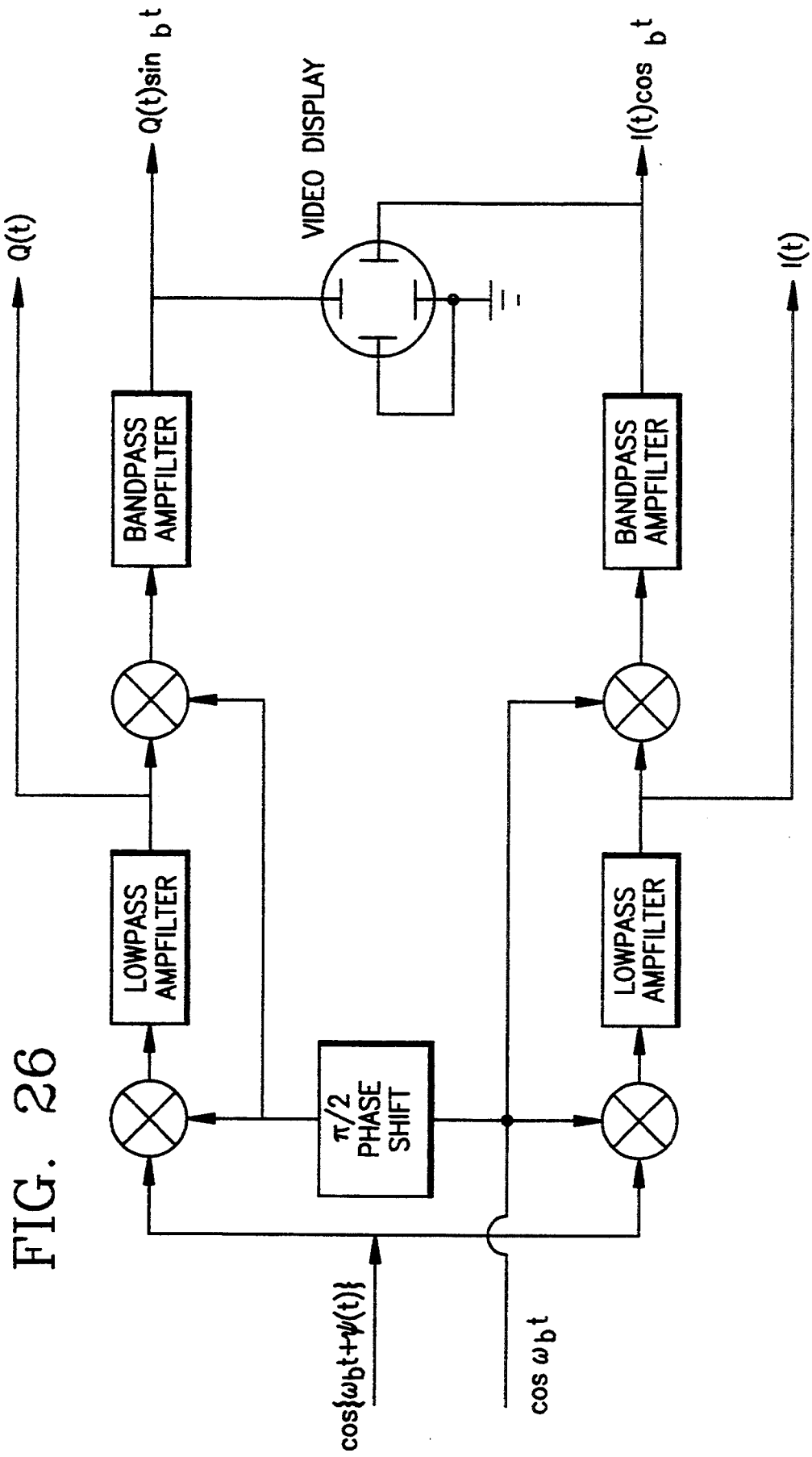
FIG. 26 illustrates methods of decomposing an induced-Doppler frequency shift (IDFS) signal into I and Q components, and computing signal phase and frequency shifts therefrom to provide yet an alternative embodiment of this invention for eliminating unwanted phase and frequency steps by computational methods.
Figure 27:
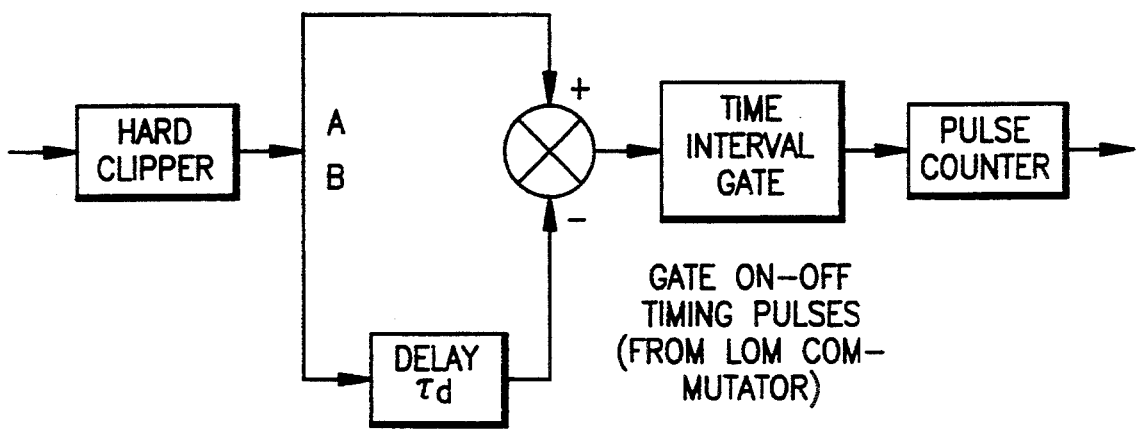
FIG. 27 illustrates a method of counting a fixed-biased IDFS amenable to correction or compensation for the effect of phase or frequency steps, according to this invention.

The process of resolving e(t) into I(t) and Q(t) components is shown by the block diagram of FIG. 26, wherein a video-display terminal method is also shown for presenting the instantaneous phase modulation $\psi(t)$ in a polar graphical display.

b)
$$\{\omega_b + \dot{\psi}(t)\}/2\pi = \text{Number of Zero Crossings of e(t)}$$
During a Counting Interval $T_c$, Divided by $2T_c$. (40)

where the zero crossings are counted by the process described by the block diagram of FIG. 27, wherein $\tau_d$ = a "differential" time delay equal to a small fraction of the period of the period of the highest-frequency component in the spectrum of $\psi(t)$ c)
$$\omega_b + \omega(t) = \kappa_d h_{lp}(t) * \{\dot{e}(t) \cdot \hat{e}(t)\} \quad (41)$$

where $\kappa_d$ = proportionality constant $h_{lp}(t)$ = unit impulse response of a lowpass filter

* denotes convolution operator $\hat{e}(t)$ = Hilbert Transform of e(t)

Dot over a time function denotes "time derivative"

Figure 28:
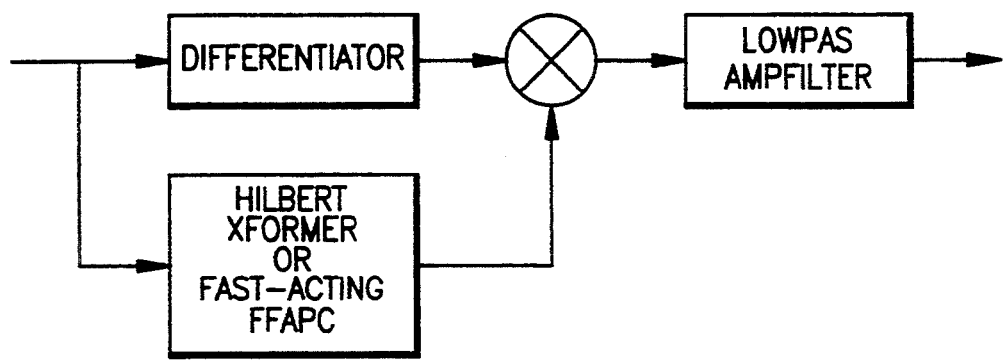
FIG. 28 illustrates alternative embodiments of a method based on differentiation for detecting or computing a fixed-biased IDFS amenable to correction or compensation for the effect of phase or frequency steps, according to this invention.
Figure 29:
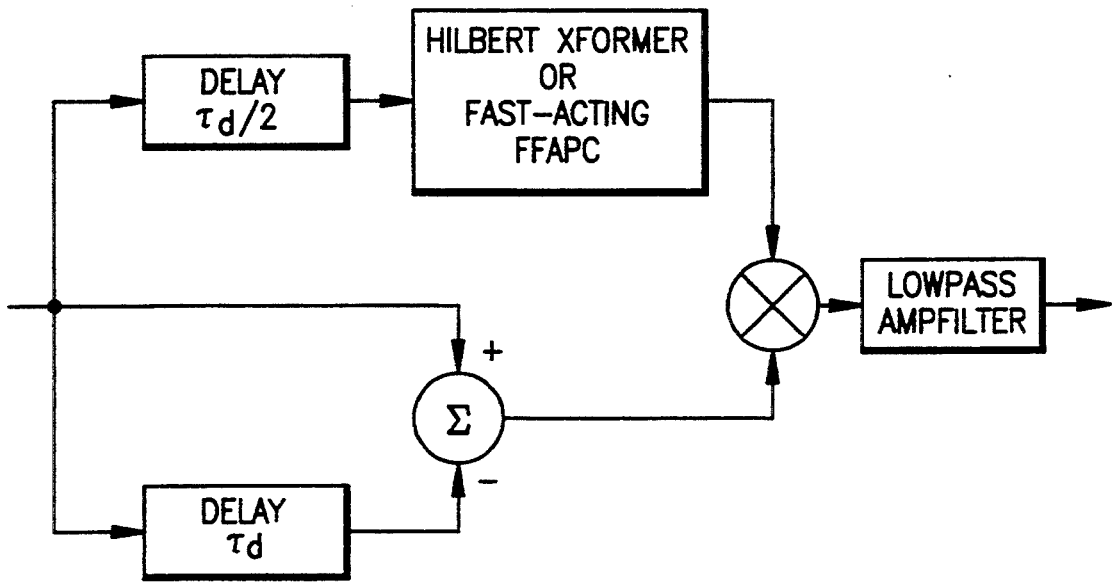
FIG. 29 illustrates alternative embodiments of a method based on differencing for detecting or computing a fixed-bias IDFS amenable to correction or compensation for the effect of phase or frequency steps, according to this invention.

The instantaneous frequency detection method according to Eq. (41) is illustrated by the block diagram of FIG. 28.

d)
$$\omega_b + \dot{\psi}(t) = \kappa_d h_{lp}(t) * \{[e(t+\tau_d/2) - e(t-\tau_d/2)]\hat{e}(t)\} \quad (42)$$

where all of the symbols are as defined before. The process of carrying out the operations in Eq. (42) is illustrated by the block diagram of FIG. 29.

The "instantaneous-frequency-domain" methods are based on the observation, with reference to FIG. 12, that during each traversal of the LOM, the moving-antenna LOM output, $e_{LOM}(t)$ (for example, Eq. (34)), is essentially (assuming a nearly constant IDFS during a traversal) a single-frequency sinusoid at the incident frequency plus the value of IDFS. Therefore, rather than content with the vagaries of a frequency-axis spectrum that is caused by the phase or frequency discontinuities to be fragmented into components at the incident (or unshifted) frequency plus and minus integer multiples of the traversal repetition frequency, with no spectral line at the frequency (incident plus IDFS) to be measured, instantaneous phase and frequency are both continuous will form a unimodal hump with peak centered at the frequency desired to be measured. A bank of filters each of bandwidth equal to the nominal width of said Fourier Transform will show maximum energy in the output of the filter that most nearly encloses the location of the main hump of said Fourier Transform during the particular interval under scrutiny. Thus, while LOM traversal interval-by-interval, or inter-impulse or inter-discontinuity of frequency analysis of the signal waveform may be carried out by any of the time-domain methods, this approach is particularly suited to "instantaneous-frequency" or time-frequency plane methods. Of particular interest in this disclosure are:

e) Quantized-frequency detection, which is a time-frequency plane or "instantaneous-frequency" or LOM-traversal-interval-wide spectral analysis by means of a bank of filters, with collateral per-interval energy detectors for routing the maximum-energy filter output at the end of each interval to a frequency-value word selector for a quantized output, or to a frequency counter for a finer-grade quantized reading.

f) Per-interval spectral analysis, according to this invention, by means of a Discrete Fourier Transform (or DFT) algorithm, such as a Fast Fourier Transform (or FFT) algorithm, based on samples of the signal waveform within one of said intervals, or on samples of the I(t) and Q(t) components of the signal within such an interval.

Discontinuities in $\psi(t)$ and $\dot{\psi}(t)$ will occur at a priori precisely known instants of time, and the magnitudes and signs of the jumps can, by the methods described in this disclosure, be separately and very accurately measured and applied to reduce, and perhaps even eliminate, the computational load at and around those points. Determination and correction for discontinuities allows the time interval of the analysis to be extended by a suitably modified algorithm to encompass as many periods of LOM traversal as the source location dynamics would allow.

The normalized Fourier transform of a sinewave at $\omega_o$ rad/sec over an LOM traversal interval of duration T sec is $$\mathcal{F}\{p_{rect,T}(t)\sin\psi_o t\} = \frac{\sin(\psi - \psi_o)T/2}{(\psi - \psi_o)T/2} \quad (43)$$

where $p_{rect,T}(t)$ denotes a rectangular pulse, or time gate function, or duration (or width) T sec. For uni- or simultaneous bi-directional LOM traversals, $T = T_m - = (1/f_m)-$; for reciprocating bi-directional traversals, $T = (T_m/2) - = (\frac{1}{2}f_m) -$. For the result of converting $e_{LOM}(t)$ of Eq. (34) to $e_{IDFS}(t)$ of Eq. (36) by any of the methods of this invention disclosed above, T is defined independently of the LOM traversal time interval, being limited on the high end basically only by the motion dynamics of the signal source relative to the LOM sensor. Evidently, the peak of the spectrum function in Eq. (43) occurs at the frequency $\omega_o$ presumed to be the object of the computation. The precision with which the peak can be located in $\omega$ is determined by the resolution of amplitude values in the computation as defined by the number of bits per code word. The width of the central lobe of the function in Eq. (43) is $4\pi/T$ rad/sec between first zeros, and 7.6/T rad/sec between one-half-of-peak points. Ninety percent of the total energy in the T sec pulse of sinewave is contained within a width of $3\pi/T$ rad/sec, centered at $\omega_o$ rad/sec, and one-half of the total energy is contained within $\pi/T$ rad/sec. These estimates of width determine the bandwidths of filters in a filter bank for determining the frequency bin within which the value of $\omega_o$ most likely falls. If, instead of a rectangular gating function, another pulse shape with tapered turn-on and turn-off is used, the sidelobes of the resulting Fourier transform would be significantly reduced, thus causing more of the energy of the gated sinewave to be concentrated within the central lobe.

While there has been described what is at present considered to be representative embodiments of the invention, it will be obvious to those skilled in the art that various changes and modifications may be made therein without departing from the invention, and it is aimed in the appended claims to cover all such changes and modifications as fall within the true spirit and scope of the invention.

For clarity in the statements of the appended claims, the following definitions of terms are provided:

Abrupt signifies occurrence within a negligible time.

Beating signifies the combined process of multiplying two separate signals followed by selecting the component of the product that is at the instantaneous phase or frequency difference.

Mixing signifies the combined process of multiplication of signals followed by selection of either the frequency-difference or the frequency-sum component.

Impulse excision signifies removal by any means, including, for specific examples in the art, clipping off the impulses, or vacating the time slots occupied by the impulses, or subtracting out the impulses.

Extracting means separating and delivering.

Small fraction signifies negligible fraction, nominally on the order of 1/10 or less.

In situ is used synonimously or on-site.

Continuous means are free of steps in phase and frequency, or of abrupt transitions between different values.

Complex-modulated signifies carrying both amplitude and frequency or phase modulation.

The structure of FIG. 8 is referred to, in this disclosure, as i) Automatic Frequency-Following Control (or AFCC) Loop, if the output 6 of the FM-Controlled-Frequency Oscillator 13 is taken as the output of the loop; and as ii) FM-Compressive Feedback (FMCF) loop, if the output 3 of the LOOP-IF AMPFILTER is taken as the output of the loop.

Hilbert Transformer (or Hilbert Xformer) is a filter that passes all component frequencies (other than 0 Hz) of a signal wave with uniform amplitude vs frequency response, and uniform $\pi/2$ rad phase-shift vs frequency response.

A fast-acting FFAPC is a frequency-following automatic phase control loop characterized by a closed-loop group (or modulation) delay that is a very small fraction (nominally 1/10 or less) of the reciprocal of the bandwidth occupied by the signal wave. The steady-state response of the controllable-frequency oscillator of such a loop is an approximation to the Hilbert transform of the signal applied at the input of the loop.

What is claimed is:

1. A method of eliminating a first selected frequency modulation component of a first signal wave carrying at least first and second frequency modulation components, comprising the steps of:

Channeling said first signal wave through two receiver branches, designated Branch A and Branch B;

Constituting said Branch A to pass said first signal wave with said first and second frequency modulation components;

Constituting said Branch B to convert said first signal wave to a second signal wave that carries as frequency modulation only one of said first or second frequency modulation components of said first signal wave;

Multiplying outputs of said Branches A and B in a multiplier/mixer means to provide an output with an instantaneous frequency difference component; and Selecting from the output of said multiplying a frequency component that carries the instantaneous frequency difference component.

2. The method of claim 1, wherein said constituting of said Branch B comprises the successive operations of:

Frequency demodulation to detect a summed frequency modulation component comprising the sum of waveforms representing said first and second frequency modulation components of said first signal wave;

Operating on said summed frequency modulation component to separate said first selected component; and Applying said first selected component waveform to modulate the frequency of an oscillator signal wave, yielding said output of said Branch B.

3. The method of claim 2, wherein

Said Branch A converts said first signal wave to a different center frequency; and Said Branch B comprises a frequency-following automatic phase control (FFAPC) loop having a loop oscillator frequency-control signal derived by separating from the summed frequency modulation component the waveform representing said first selected component.

4. The method of claim 2, wherein said Branch B comprises an automatic frequency-following control (AFFC) loop having a loop oscillator frequency-control signal derived by separating from the summed frequency modulation component the waveform representing said first selected component.

5. The method of claim 2, wherein

Said Branch A comprises a frequency-following automatic phase-control (FFAPC) loop having a loop oscillator frequency-control signal which is said summed frequency modulation component; and Said Branch B comprises a frequency-following automatic phase-control (FFAPC) loop having a loop oscillator frequency-control signal derived by separating from said summed frequency modulation component the waveform representing said first selected component, followed by a frequency converter for shifting the output of said FFAPC loop oscillator to a different center frequency.

6. The method of claim 2, wherein

Said Branch A comprises an automatic frequency-following control (AFFC) loop having a loop oscillator frequency-control signal which is said summed frequency modulation component;

Said Branched B comprises an automatic frequency-following control (AFFC) loop having a loop oscillator frequency-control signal which is derived by separating from said summed frequency modulation component the waveform representing said first selected component; and Said Branch A and Branch B AFFC loop oscillators have different free-running oscillator frequencies.

7. The method of claim 2, wherein said operating on said summed frequency modulation component when said first component and second component spectra are both centered at 0 Hz, overlap and one of the two occupies a significantly narrower bandwidth around 0 Hz than the other, comprises the steps of:

Suppressing said narrower-band component by means of a filter characterized by an attenuation band centered at 0 Hz with a cutoff characteristic that is odd-symmetrical about the mid-cut-off frequency;

Multiplying the output of said filter by a sinewave signal having a frequency equal to said mid-cutoff frequency; and Passing the product of said multiplying through a lowpass filter.

8. The method of claim 2, wherein said operating on said summed frequency modulation component when one of said first and second component waveforms is a pulse-modulation waveform, comprises Channeling said summed frequency modulation component through two parallel sub-branches designated Sub-branch C and Sub-branch D;

Said Sub-branch C comprising lowpass filter one;

Said Sub-branch D comprising in succession a bandpass filter with passband response versus frequency that is the bandpass analog of the passband response versus frequency of said lowpass filter one, centered about a harmonic of the frame repetition frequency of said pulse-modulation waveform, followed by a coherent-product demodulator employing a demodulation sinewave at the frequency of said harmonic of the frame repetition frequency; and Subtracting the output of said Sub-branch D from the output of said Sub-branch C.

9. The method of claim 2, wherein

Said branch A is constituted of a loop mixer, followed by a loop IF amplifierfilter of an automatic frequency-following control (AFFC) loop; and Said Branch B is constituted of an AFFC loop FM demodulator, followed by an AFFC loop operation for separting waveform representing said first selected component, which drives a low-modulation-index controllable-frequency oscillator external to said AFFC loop.

10. The method of claim 2, wherein said Branch B comprises an automatic frequency-following control (AFFC) loop having a oscillator frequency control signal which is derived by suppressing the waveform representing said first selected component in said baseband.

* * * * *